US010310774B2

(12) United States Patent
Chhabra et al.

(10) Patent No.: US 10,310,774 B2
(45) Date of Patent: Jun. 4, 2019

(54) TECHNIQUES FOR DATA STORAGE PROTECTION AND INTEGRITY CHECKING

(71) Applicant: INTEL CORPORATION, Santa Clara, CA (US)

(72) Inventors: Siddhartha Chhabra, Hillsboro, OR (US); David M. Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 233 days.

(21) Appl. No.: 14/998,323

(22) Filed: Dec. 24, 2015

(65) Prior Publication Data

US 2017/0185529 A1 Jun. 29, 2017

(51) Int. Cl.

| | |
|---|---|
| ***G06F 11/30*** | (2006.01) |
| ***G06F 12/14*** | (2006.01) |
| ***G06F 3/06*** | (2006.01) |
| ***G06F 12/02*** | (2006.01) |
| ***G06F 21/60*** | (2013.01) |
| ***G06F 21/82*** | (2013.01) |

(52) U.S. Cl.

CPC .......... *G06F 3/0685* (2013.01); *G06F 3/0623* (2013.01); *G06F 3/0661* (2013.01); *G06F 12/023* (2013.01); *G06F 12/145* (2013.01); *G06F 12/1408* (2013.01); *G06F 21/602* (2013.01); *G06F 21/82* (2013.01); *G06F 2212/1052* (2013.01); *G06F 2212/401* (2013.01); *G06F 2212/402* (2013.01); *G06F 2212/60* (2013.01)

(58) Field of Classification Search

None

See application file for complete search history.

(56) References Cited

U.S. PATENT DOCUMENTS 7,814,316 B1 10/2010 Hughes et al.
8,300,823 B2 10/2012 Bojinov et al.
8,538,936 B2 9/2013 Williams et al.

(Continued)

OTHER PUBLICATIONS

International Search Report and Written Opinion received for PCT Patent Application No. PCT/US2016/066763, Mar. 13, 2017, 15 pages.

*Primary Examiner* — Lynn D Feild
*Assistant Examiner* — Vadim Savenkov

(57) ABSTRACT

Various embodiments are generally directed to techniques for encrypting stored data. An apparatus includes a processor component comprising a cache that comprises a cache line to store a first block of data corresponding to a second block of encrypted data stored within a storage; a compressor to compress the data within the first block to generate compressed data within the first block to clear sufficient storage space within the first block to store metadata associated with generation of the second block of encrypted data from the first block in response to eviction of the first block from the cache line; and an encrypter to encrypt the compressed data within the first block to generate the encrypted data within the second block and to store encryption metadata associated with encrypting the compressed data within the second block as a portion of the metadata associated with the generation of the second block.

25 Claims, 15 Drawing Sheets

(56) References Cited

U.S. PATENT DOCUMENTS

| | | | | |
|---|---|---|---|---|
| 8,621,241 | B1 * | 12/2013 | Stephenson | G06F 12/14 713/189 |
| 8,762,642 | B2 * | 6/2014 | Bates | H04L 9/0894 711/117 |
| 9,274,956 | B1 * | 3/2016 | Salyers | G06F 12/0808 |
| 9,405,928 | B2 * | 8/2016 | Amarendran | G06F 21/6218 |
| 2001/0052075 | A1 * | 12/2001 | Feinberg | G06F 21/445 713/168 |
| 2008/0104484 | A1 * | 5/2008 | Jacobson | G06F 11/1076 714/770 |
| 2008/0195912 | A1 * | 8/2008 | Mende | H03M 13/09 714/752 |
| 2009/0228744 | A1 * | 9/2009 | Deenadhayalan | G06F 11/1004 714/48 |
| 2012/0054582 | A1 * | 3/2012 | Byom | G06F 11/1072 714/773 |
| 2013/0246711 | A1 | 9/2013 | Testardi et al. | |
| 2014/0281146 | A1 | 9/2014 | Horn | |
| 2017/0199820 | A1 * | 7/2017 | Romanovskiy | G06F 12/0873 |

* cited by examiner

500

500

2100

TECHNIQUES FOR DATA STORAGE PROTECTION AND INTEGRITY CHECKING

BACKGROUND

Malware attacks continue to employ an ever increasing array of techniques to gain control of processing devices and/or to make unauthorized accesses to the data stored therein. Concern has grown that, in processing devices incorporating multiple hardware components that are capable of independent execution of instructions, malware (e.g., viruses, worms, etc.) may be employed to gain control over one of such hardware components, and to then cause that component to improperly retrieve and/or manipulate data and/or executable instructions associated with another of such hardware components.

More specifically, in processing devices incorporating a main processor component and one or more other hardware components capable of executing instructions independently of the main processor component, concern is growing that the instructions executed by one of such other hardware components may be compromised to cause it to access storage spaces associated with the main processor component. In so doing, such a hardware component may be caused to improperly retrieve data from such storage spaces for retransmission elsewhere, and/or may be caused to alter executable instructions that are to be executed by the main processor component as a mechanism to gain control over the main processor component.

DETAILED DESCRIPTION

Figure 1:
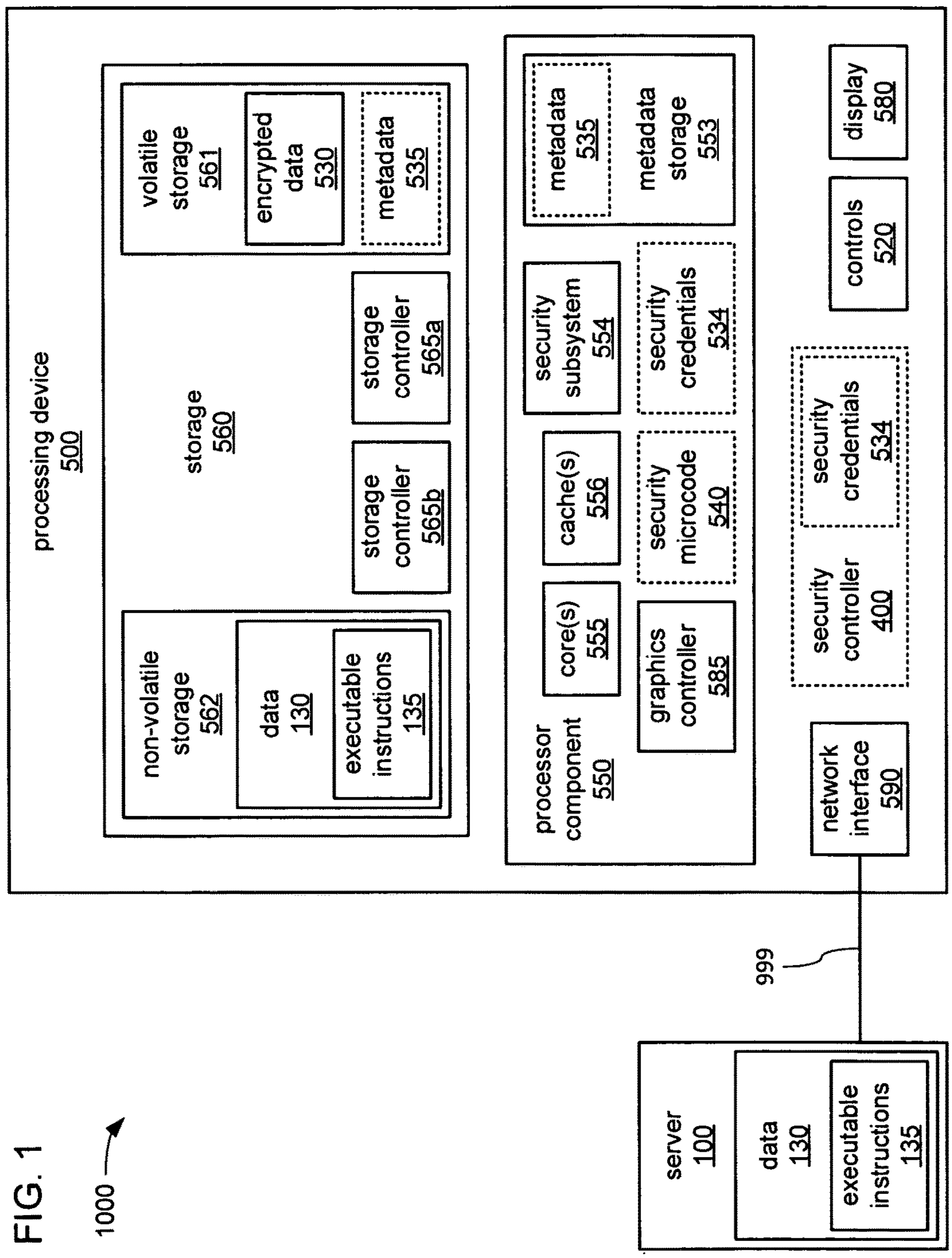
FIG. 1 illustrates an example embodiment of a secure processing system.

Various embodiments are generally directed to techniques for encrypting stored data in a manner that minimizes reductions in performance. As a block of data is stored by a main processor component within a storage of a processing device, the data within that block may be compressed to use less of the storage space within that block. Presuming that the data was able to be compressed to a sufficient degree, metadata associated with at least the compression of the data may then be stored within the portion of the block that is no longer occupied by the data as a result of its compression. Then, at least the compressed data, if not also the metadata, may be encrypted to generate encrypted. Thus, a new block of encrypted data made up of a combination of the data in compressed and at least the metadata associated with the compression may be created from the original block, and the new block may be stored within the storage, instead of the original block. When that block of data is subsequently retrieved from the storage by the main processor component, the encrypted data may be decrypted to recreate the compressed data and at least the metadata associated with the compression. The metadata associated with the compression may then be employed to decompress the recreated compressed data to recreate the block in its original form, including the data in its original uncompressed and unencrypted form.

It may be that, the size of each block may be selected to match the size of the cache lines of a cache of the main processor component. In such embodiments, such compression and/or encryption may be performed as such a block of data is evicted from a cache line to be stored within the storage, and it may be that such decryption and/or decompression may be performed on such a block of encrypted data that is retrieved from the storage to fill a cache line. In other embodiments, such compression and/or encryption may be performed as a processor core of the processor component outputs a block of data into a cache line as part of outputting that block of data to the storage, and such decryption and/or decompression may be performed on a block of encrypted data that is retrieved from such a cache line by a processor core of the processor component. In embodiments in which the cache is filled speculatively by a cache controller or other component of the main processor component that attempts to predict what data will next need to be retrieved from the storage, the speculatively retrieved blocks may not be decrypted or decompressed until the data therein is requested by a processor core of the processor component.

The combining of metadata associated with at least compression in each block along with the data in compressed form may be deemed desirable as it enables the retrieval of that metadata directly from each block, thereby obviating the need to separately retrieve that metadata for each block from another source. Since such decryption and/or decompression may be performed as part of retrieving such blocks to fill cache lines and/or to enable a processor core to continue executing instructions making up at least part of the data, avoiding the need to separately retrieve that metadata from another source for each block may desirably reduce the time required in so retrieving those blocks. However, such inclusion of metadata associated with at least compression in each block necessarily requires that the data within each block is able to be compressed to a sufficient degree to make available sufficient storage space within each block to store that metadata therein.

Unfortunately, depending on factors such as characteristics of the data, the size of each block, the size of the metadata, etc., there may be instances in which the data within a block is not able to be compressed sufficiently to make available sufficient storage to also store the metadata associated with at least compression. In such instances, it may be that data stored within that block is then encrypted, but is not compressed, thereby generating a new block to be stored within the storage in which the encrypted data is not accompanied by metadata. In such instances, if there is metadata associated with the encryption or other operations performed on the data, then such metadata may be stored separately, either in a separate location within the same storage as an additional newly generated block, or within entirely separate storage. As will be explained in greater detail, any of a variety of mechanisms may be employed to distinguish blocks stored within the storage in which the data is compressed from blocks stored within the storage in which the data is not compressed.

Thus, as part of retrieving a block stored within the storage to fill a cache line and/or to provide more executable instructions to a processor core, a determination may first be made as to whether the original data used to generate that block was compressed such that the block includes metadata associated with at least the compression of that data. If the data within that block is compressed, then the data is decrypted to recreate at least that compressed data, and then the metadata associated with at least compression may be used to decompress that recreated compressed data to recreate the original data in its uncompressed and unencrypted form. However, if the original data used to generate that block was not compressed, then there may not be any metadata associated with compression, and any metadata that might exist that may be associated with encryption and/or any other operation performed on the original data must be retrieved from another location within the storage or from a different storage. The encrypted data may then be decrypted to recreate the original data in its original uncompressed and unencrypted form.

The type of compression used may be any of a variety of types of lossless compression. In some embodiments, more than one type of lossless compression may be used, and the type of lossless compression employed in compressing the data within each block may be individually selectable for each block. It may be that the selection of which type of compression is used for each block may be at least partly based on the degree of compression achieved with each type for each block based on the characteristics of the data being compressed within each block. As familiar to those skilled in the art of compression, data made up of different patterns among its bits and/or bytes may be compressible to differing degrees using different types of compression. More specifically, data in one block may be compressible to a greater degree using one type of compression while data in another block may be compressible to a greater degree using another type of compression. Also factoring into the selection of a type of compression for each block may be the amount of storage space required for the metadata associated with each type of compression. Thus, in such embodiments, the metadata associated with compression may include an indication of which type of compression was used.

The type of encryption used may also be any of a variety of types. In some embodiments, more than one type of encryption may be used, and the type of encryption employed in encrypting each block may be selectable for each block. If any of the types of encryption used generates any metadata associated with encryption, then it may be that the selection of which type of encryption is used for each block may be at least partly based on the amount of storage space required for any metadata associated with the encryption if there is some variability in the amount of storage space required for such metadata between the types of encryption used. Thus, in such embodiments, if there is any metadata associated with encryption, such metadata may include an indication of which type of encryption was used.

Regardless of the type of compression and/or the type of encryption used, the metadata may additionally include integrity metadata providing an indication of a measure for use in checking the integrity of at least a portion of the data after it is subsequently decrypted and/or decompressed. More specifically, such a measure taken of the at least a portion of the data within a block before that data is compressed and/or encrypted may be any of a variety of types of measure, including and not limited to, a checksum, a hash or a cryptographic hash. Where the measure is a cryptographic hash, it may be based on one of versions of the secure hash algorithm (SHA), such as SHA-1, SHA-2, SHA-3 or the hash method authentication codes (SHA-HMAC). After a subsequent decryption and/or decompression of the data within that block, the same type of measure may be taken of the recreated data and compared to that type of measure that was originally taken of the original data to determine if the original data, as stored, has in any way been altered since being stored within the storage.

In some embodiments, the type of encryption used to encrypt the data within each block (whether compressed, or not) may use an address associated with the location in the storage at which that block is to be stored as an input into the algorithm for the encryption. An example of such encryption may be XEX-based tweaked-codebook mode with ciphertext stealing (XTS—a variant of which is promulgated by IEEE as standard P1619) in which the address may be employed as the tweak. Then, an address associated with the location within the storage from which that block is subsequently retrieved may be used as an input into the algorithm for the decryption of the data. In this way, if the block is moved about within the storage after being stored at that address by malware, the resulting change in address associated with such a change in location within the storage will adversely affect the decryption of the encrypted data within the block, and this will result in the decrypted form of the data being entirely different from what it was when originally encrypted, which may be enough to defeat whatever purpose was sought to be achieved by moving the block. Alternatively or additionally, in embodiments that employ the aforementioned integrity value, such a difference between the data as it was before encryption and as it is after decryption brought about by the changed address will result in the failure of any check of integrity performed using the integrity value. Such a failure in the integrity check may cause the decrypted form of the data to be rejected and not used by the processor component, which may be enough to defeat whatever purpose was sought to be achieved by moving the block.

In some embodiments, the storage to which the blocks containing encrypted and/or compressed data may be written and from which those blocks may subsequently be read may be volatile storage made up of storage devices employing a storage technology in which whatever is stored therein is only retained as long as electric power continues to be provided. As familiar to those skilled in the art, such storage technologies often provide faster storage and retrieval times than storage technologies often employed by non-volatile storage made up of storage devices in which whatever is stored therein continues to be retained regardless of whether electric power is continuously provided, or not. As a result, data (including data at least partially made up of executable instructions) may remain stored within non-volatile storage as longer term storage that does not need to be continuously provided with electric power, while portions of the data may be copied into volatile storage with its faster storage and retrieval times for execution by the main processor component. It may be that, while portions of data are so stored in volatile storage in preparation for use by the main processor component, malicious software may cause another hardware component to access that data to generate unauthorized copies thereof and/or to alter it in a manner intended to take control of the processing device. Such efforts by malware may be thwarted by the encryption described herein.

It should be noted, however, that although much of the discussion herein centers on the compression and/or encryption of data before it is stored within volatile storage by a main processor component, other embodiments are possible in which such compression and/or encryption may be employed in the storage of data in non-volatile storage and/or by components of a processing system other than a main processor component. By way of example, such compression and/or encryption may be performed prior to storage of data on a hard disk drive, non-volatile removable solid state storage, or non-volatile storage serving as the main or system memory of the processing device 500 (e.g., FLASH memory, phase-change memory, etc.). Alternatively or additionally, such compression and/or encryption may be performed prior to the storage of data by a processor component of a graphics subsystem, instead of by the main processor component, although it may be the main processor component that actually performs the compression and/or encryption, as will shortly be explained.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a secure processing system 1000 incorporating a server 100 and a processing device 500 coupled via a network 999. The server 100 and the processing device 500 may exchange data 130 via the network 999, and the data 130 may include executable instructions 135 for execution within the processing device 500. It is important to note that the data 130 may be made up of data values, executable instructions or a combination of both.

In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the processing device 500 may incorporate a processor component 550, a storage 560, manually-operable controls 520, a display 580 and/or a network interface 590 to couple the processing device 500 to the network 999. The processor component 550 may incorporate security credentials 534, a security microcode 540, metadata storage 553 storing metadata 535, a security subsystem 554, one or more processor cores 555, one or more caches 556 and/or a graphics controller 585. The storage 560 may incorporate volatile storage 561, non-volatile storage 562 and/or storage controllers 565*a-b*. The processing device 500 may also incorporate a controller 400 that may incorporate the security credentials 534.

The volatile storage 561 may be made up of one or more storage devices that are volatile inasmuch as they require the continuous provision of electric power to retain information stored therein. Operation of the storage device(s) of the volatile storage 561 may be controlled by the storage controller 565*a*, which may receive commands from the processor component 550 and/or other components of the processing device 500 to store and/or retrieve information therein, and may convert those commands between the bus protocols and/or timings by which they are received and other bus protocols and/or timings by which the storage device(s) of the volatile storage 561 are coupled to the storage controller 565*a*. By way of example, the one or more storage devices of the volatile storage 561 may be made up of dynamic random access memory (DRAM) devices coupled to the storage controller 565*a* via an interface in which row and column addresses, along with byte enable signals, are employed to select storage locations, while the commands received by the storage controller 565*a* may be conveyed thereto along one or more pairs of digital serial transmission lines.

The non-volatile storage 562 may be made up of one or more storage devices that are non-volatile inasmuch as they are able to retain information stored therein without the continuous provision of electric power. Operation of the storage device(s) of the non-volatile storage 562 may be controlled by the storage controller 565*b*, which may receive commands from the processor component 550 and/or other components of the processing device 500 to store and/or retrieve information therein, and may convert those commands between the bus protocols and/or timings by which they are received and other bus protocols and/or timings by which the storage device(s) of the non-volatile storage 562 are coupled to the storage controller **565*b*. By way of example, the one or more storage devices of the non-volatile storage 562 may be made up of ferromagnetic disk-based drives (hard drives) coupled to the storage controller 565*b* via a digital serial interface in which portions of the storage space within each such storage device are addressed by reference to tracks and sectors. In contrast, the commands received by the storage controller 565*b* may be conveyed thereto along one or more pairs of digital serial transmission lines conveying read and write commands in which those same portions of the storage space within each such storage device are addressed in an entirely different manner. The processor component 550 incorporates at least one processor core 555 to execute instructions of an executable routine in at least one thread of execution. However, the processor component 550 may incorporate more than one of the processor cores 555 and/or may employ other processing architecture techniques to support multiple threads of execution by which the instructions of more than one executable routine may be executed in parallel. The cache(s) 556 may be made up of a multilayer set of caches that may include separate first level (L1) caches for each processor core 555 and/or a larger second level (L2) cache for multiple ones of the processor cores 555**.

In embodiments of the processing device 500 that incorporate the display 580 and/or the graphics controller 585, the one or more cores may, as a result of executing the executable instructions of one or more routines, may operate the manually-operable controls 520 and/or the display 580 to provide a user interface and/or to perform other graphics-related functions. The graphics controller 585 may incorporate a graphics processor core and/or component (not shown) to perform graphics-related operations, including and not limited to, decompressing and presenting a motion video, rendering a 2D image of one or more objects of a three-dimensional (3D) model, etc.

The non-volatile storage 562 may store the data 130, including the executable instructions 135. In the aforementioned exchanges of the data 130 between the processing device 500 and the server 100, the processing device 500 may maintain a copy of the data 130 for longer term storage within the non-volatile storage 562. The volatile storage 561 may store encrypted data 530 and/or the metadata 535. The encrypted data 530 may be made up of at least a portion of the data 130 stored within the volatile storage 561 in encrypted and/or compressed form as will be explained in greater detail. The executable instructions 135 may make up one or more executable routines such as an operating system (OS), device drivers and/or one or more application routines to be executed by the one or more processor cores 555 of the processor component 550. Other portions of the data 130 may be made up of data values that are employed by the one or more processor cores 555 as inputs to performing the various tasks that the one or more processor cores 555 are caused to perform by execution of the executable instructions 135.

As part of executing the executable instructions 135, the one or more processor cores 555 may retrieve portions of the executable instructions 135 and store those portions within the volatile storage 561 in a more readily executable form in which addresses are derived, indirect references are resolved and/or links are more fully defined among those portions in the process often referred to as loading. As familiar to those skilled in the art, such loading may occur under the control of a loading routine and/or a page management routine of an OS that may be among the executable instructions 135. As portions of the data 130 (including portions of the executable instructions 135) are so exchanged between the non-volatile storage 562 and the volatile storage 561, the security subsystem 554 may convert those portions of the data 130 between what may be their original uncompressed and unencrypted form as stored within the non-volatile storage 562, and a form that is at least encrypted and that may be stored within the volatile storage 561 as the encrypted data 530 accompanied by the metadata 535.

The security subsystem 554 may be made up of hardware logic configured or otherwise controlled by the security microcode 540 to implement the logic to perform such conversions during normal operation of the processing device 500. The security microcode 540 may include indications of connections to be made between logic circuits within the security subsystem 554 to form such logic. Alternatively or additionally, the security microcode 540 may include executable instructions that form such logic when so executed. Either the security subsystem 554 may execute such instructions of the security microcode 540, or the security subsystem 554 may be controlled by at least one processor core 555 that executes such instructions. The security subsystem 554 and/or at least one processor core 555 may be provided with access to the security microcode 540 during initialization of the processing device 500, including initialization of the processor component 550.

The security credentials 534 may include one or more values employed by the security subsystem 554 as inputs to its performance of encryption of the data 130 and/or of decryption of the encrypted data 530 as part of performing conversions therebetween during normal operation of the processing device 500. More specifically, the security credentials 534 may include any of a variety of types of security credentials, including and not limited to, public and/or private keys, seeds for generating random numbers, instructions to generate random numbers, certificates, signatures, ciphers, etc. The security subsystem 554 may be provided with access to the security credentials 534 during initialization of the processing device 500.

Figure 2:
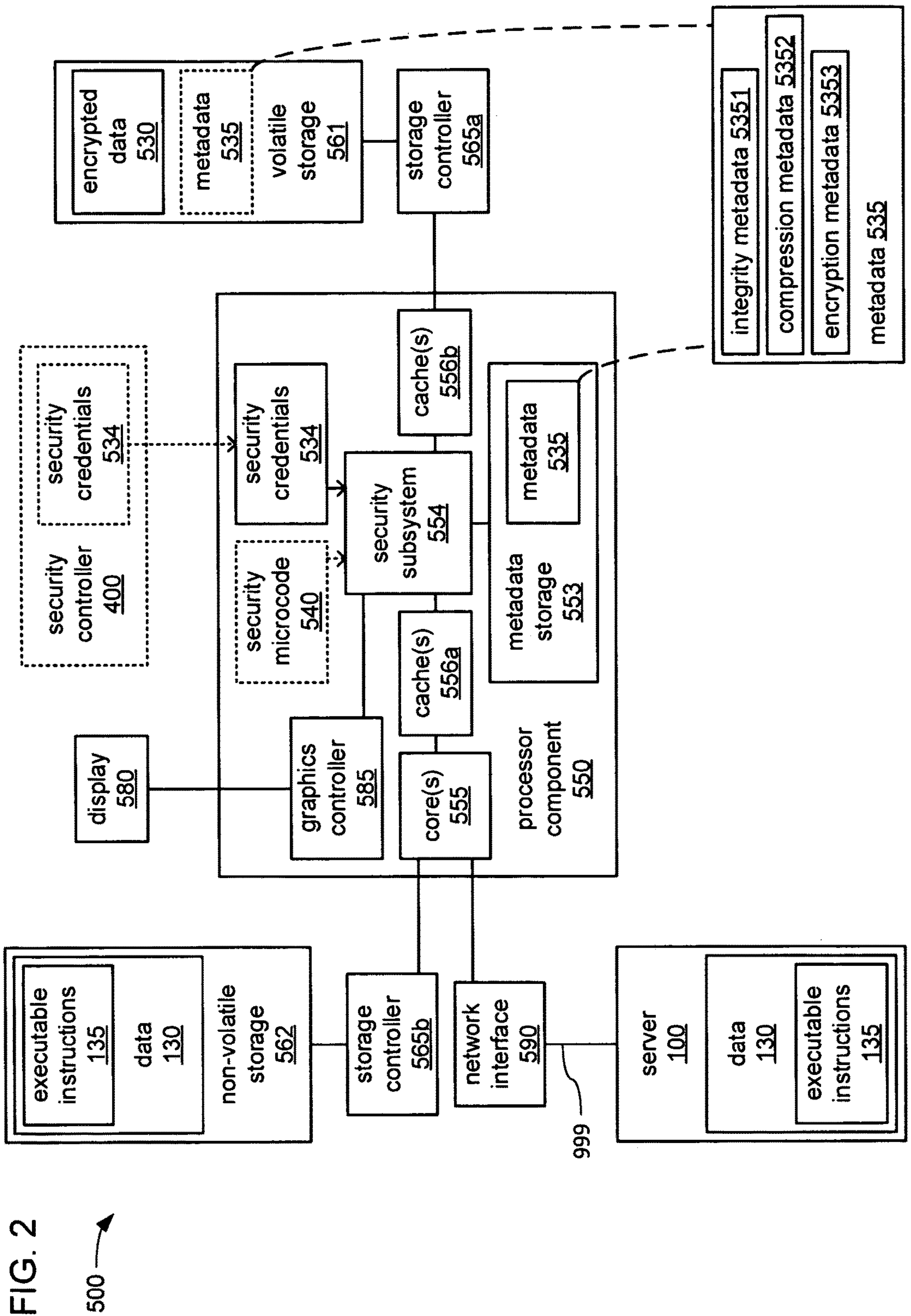
FIG. 2 illustrates an example embodiment of a processing device.

FIG. 2 illustrates an example of such initialization and normal operation of the processing device 500, including conversions between the data 130 and the encrypted data 530, in greater detail. During initialization of the processing device 500, the controller 400 (if present) and/or the processor component 550 may perform various checks of integrity of their own internal components and/or of other components of the processing device 500 to determine if various requirements are met within the processing device 500 to proceed with initialization to the extent of beginning normal operation through the execution of an OS, device drivers and/or one or more application routines. Among the various preparations for normal operation may be execution and/or other use of the security microcode 540 by at least one processor core 555 and/or by the security subsystem 554 to prepare for encrypting/decrypting and/or compressing/decompressing portions of the data 130. In so doing, the security credentials 534 may be retrieved by and/or provided to the security subsystem 554 for use in performing such encryption/decryption. As depicted, in embodiments that include the controller 400, the processor component 550 may receive the security credentials 534 from the controller 400, and such provision of the security credentials 534 may be conditioned on the successful formation of a chain of trust between the controller 400 and the processor component 550.

As previously discussed, in some embodiments, measures may be taken of blocks of the data 130 as part of its conversion for storage as blocks of the encrypted data 530, and such measures may subsequently be used to check the integrity of blocks of encrypted data 530 upon retrieving them from storage and converting them back into recreations of the blocks of data 130. In some embodiments, as part of initialization of the processing device 500, to initialize storage locations within the volatile storage 561 and/or within other portions of the storage 560 overall to a value indicative of no data having been stored therein as a mechanism to prevent instances of false detection of corruption of data. As will be explained in greater detail, this may be deemed desirable as any instance of detection of corruption of stored data may trigger various responses, including and not limited to, reinitialization of the processing device 500 and/or disconnection of the processing device 500 from the network 999 such that false instances of detecting corruption of data may be deemed undesirably disruptive.

As part of and/or after such preparations, the one or more processor cores 555 of the processor component 550 may begin retrieving one or more portions of the data 130 (including one or more portions of the executable instructions 135) from the non-volatile storage 562 and/or from the server 100, and may begin storing the one or more portions of the data 130 within the volatile storage 561 as part of loading an OS, device drivers and/or application routine(s) in preparation for executing one or more of those. As such storing of one or more portions of the data 130 into the volatile storage 561, the security subsystem 554 compresses and/or encrypts the one or more portions to generate the encrypted data 530, and it is the encrypted data 530 that is stored within the volatile storage 561.

As depicted, the processor component 550 may be coupled to the volatile storage 561 through the storage controller 565*a*, may be coupled to the non-volatile storage 562 through the storage controller 565*b*, and may be coupled to the server 100 through the network interface 590 and the network 999. As also depicted, the coupling of the one or more processor cores 555 to the storage controller 565*a* may be through one or more of the caches 556 (e.g., one or both of the depicted caches 556*a* and 556*b*) and through the security subsystem 554. Thus, accesses made by the one or more processor cores 555 to the data 130 within the non-volatile storage 562 and/or within the server 100 may not be cached, and may not entail any use of compression and/or encryption. In contrast, accesses made by the one or more processor cores 555 to the data 130 (in its encrypted form as the encrypted data 530) within the volatile storage 561 may be cached, and may entail the use of one or both of compression and encryption.

In some embodiments, there may be an input/output (I/O) address space that is separate and distinct from a memory address space. In such embodiments, the storage controller 565*b* and/or the network interface 590 may be mapped into the I/O address space, while the storage controller 565*a* may be mapped into the memory address space. In such embodiments, the processor component 550 may, at least generally, cache only accesses made in the memory address space, while not caching accesses made in the I/O address space. As a result, accesses made to the volatile storage 561 may be cached, while accesses to the non-volatile storage 562 and/or to the storage provided by the server 100 may not be cached. In other embodiments, the storage controller 565*b* and/or the network interface 590 may be mapped into the same address space as the storage controller 565*a*. However, in such embodiments, the processor component 550 may be capable of selectively employing the caching provided by the caches 556*a* and/or 556*b* to one or more specific ranges of addresses within that address space, such that again, accesses made to the volatile storage 561 may be cached, while accesses to the non-volatile storage 562 and/or to the storage provided by the server 100 may not be cached.

As depicted, the security subsystem 554 may be positioned between at least one of the caches 556 and the volatile storage 561, such as the depicted cache 556*a*. In such instances, the cache lines of such a cache may store uncompressed and unencrypted portions of the data 130. However, as also depicted, the security subsystem 554 may alternatively or additionally be positioned between at least one of the caches 556 and the one or more processor cores 555, such as the depicted cache 556*b*. In such instances the cache lines of such a cache may store portions of the data 130 that have been at least encrypted, such as portions of the encrypted data 530. Thus, in various embodiments of the processor component 550 only one of the caches 556*a* or 556*b* may be present. It should be noted, however, that despite such specific depictions and discussion of such co-location of the security subsystem 554 with one or more caches 556, other embodiments are possible in which the security subsystem 554 may be incorporated into an embodiment of the processor component 550 that does not incorporate a cache 556, at all.

As depicted, the security subsystem 554 may be coupled to the metadata storage. Metadata 535 associated with taking measures of portions of the data 130, compressing those portions of the data 130 and/or encrypting those portions of the data 130 may be stored by the security subsystem 554 within the metadata storage 553 as such measures are taken, and such compression and/or encryption is performed. As depicted, the metadata 535 for such a portion of the data 130 may include integrity metadata 5351 made up of one or more values derived from taking a measure of the portion of data 130, compression metadata 5352 made up of one or more values associated with compression that may be performed on the portion of data 130, and/or encryption metadata 5353 (if there is any) made up of one or more values associated with encrypting of the portion of the data 130 to create a corresponding portion of the encrypted data 530. In some embodiments, such storage of the metadata 535 within the metadata storage 553 for each portion of the data 130 that is compressed and/or encrypted may be temporary as part buffering it during such conversion. In other embodiments where the metadata 535 is sufficiently small in size, such storage of the metadata 535 within the metadata storage 553 for each portion of the data 130 that is compressed and/or encrypted may continue for at least as long as the corresponding portion of the encrypted data 530 continues to be stored within the volatile storage 561.

As depicted, the graphics controller 585 may be coupled to the security subsystem 554 to cause data that the graphics controller 585 stores within the volatile storage 561 to be compressed and/or encrypted, as well as to cause data that the graphics controller 585 retrieves from the volatile storage 561 to be decrypted and/or decompressed. In some embodiments, it may be that a graphics processor core and/or graphics processor component of the graphics controller 585 may be permitted overlapping access to storage locations within the volatile storage 561 as part of a shared memory architecture of an of a variety of types. By way of example, it may be that one or more of the processor cores 555 of the main processor component 550 stores portions of motion video and/or portions of 3D model within the volatile storage 561 for the graphics controller 585 to retrieve and use as input in performing graphics-related operations. By routing such accesses by the graphics controller 585 through the same security subsystem 554, the graphics controller 585 may not be prevented by the encryption employed by the security subsystem 554 from accessing such data.

Figure 3A:
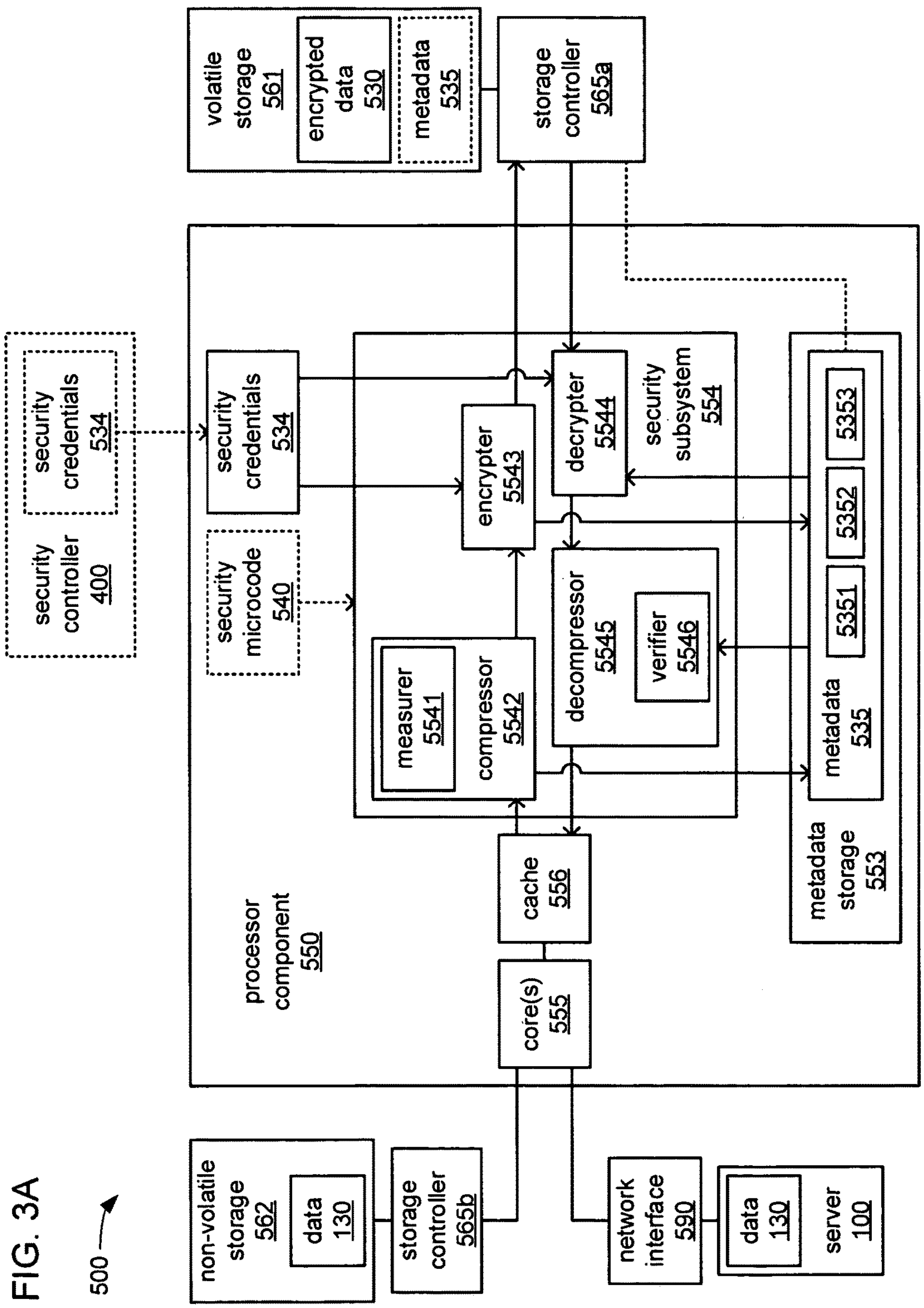
FIGS. 3A and 3B, together, illustrates an example embodiment of a security subsystem.
Figure 3B:
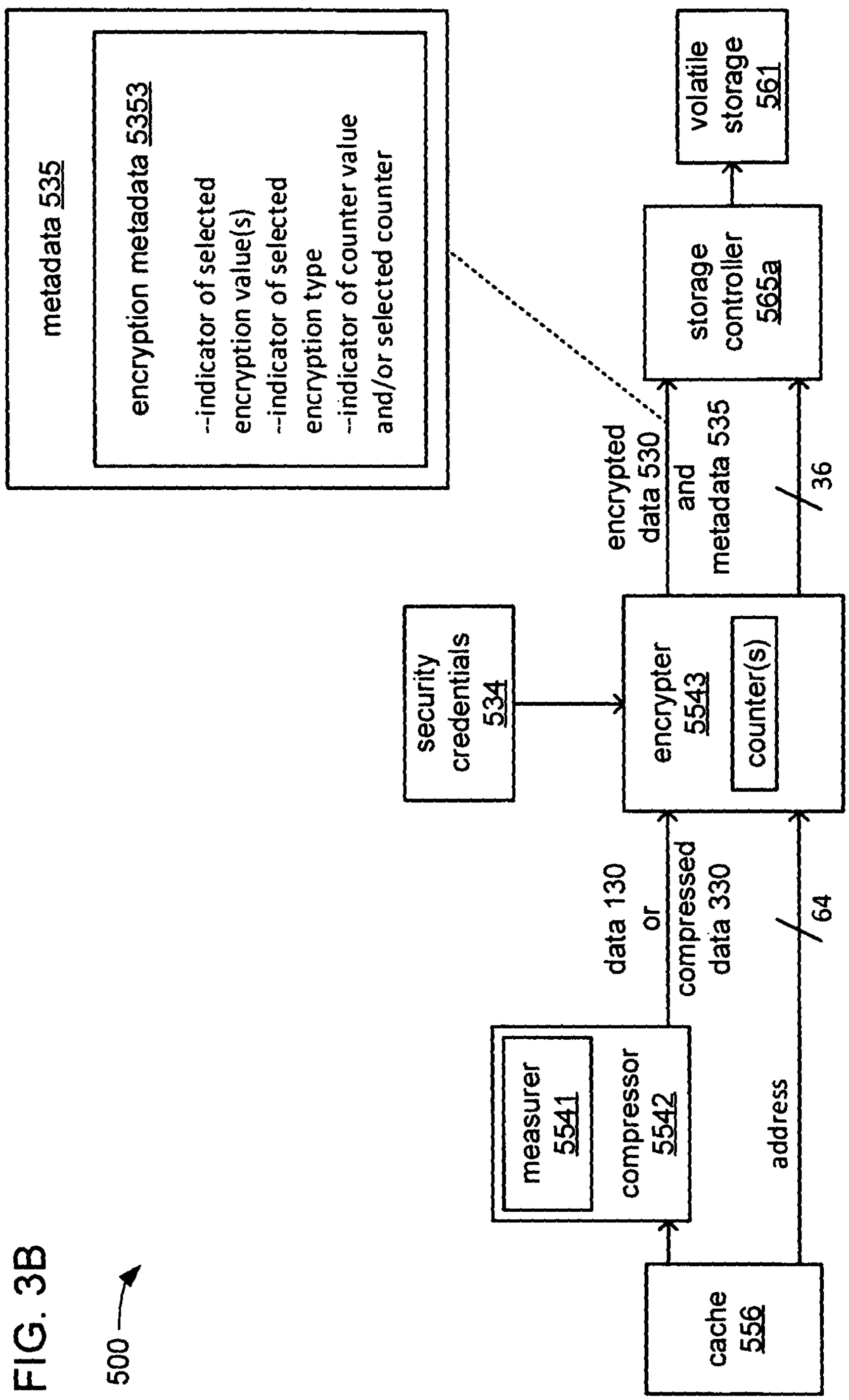

FIGS. 3A and 3B, together, depict aspects of the conversions performed by the security subsystem 554 between the data 130 and the encrypted data 530 in greater detail. As depicted in FIG. 3A, the security subsystem 554 may be made up of multiple components 5541, 5542, 5543, 5544, 5545 and/or 5546. Although in various embodiments each of these components may be implemented either entirely with hardware-based logic circuits or a combination of logic circuits and executable instructions, it may be deemed desirable to minimize the latencies by which data propagates through the security subsystem 554 to such a degree that most of, if not the entirety of, each of these components 5541, 5542, 5543, 5544, 5545 and/or 5546 may be implemented with hardware-based logic circuits. In some of such embodiments, the logic circuits may be implemented with any of a wide variety of programmable logic devices in which the interconnections among at least some of the logic circuits may be configurable, and the security microcode 540 may incorporate indications of such interconnections among such logic circuits making up one or more of the components 5541, 5542, 5543, 5544, 5545 and 5546.

It is important to note for sake of understanding of the following discussion that the security subsystem 554 performs various operations on portions of the data 130 referred to as "blocks" that may all be of a size (e.g., in bits and/or bytes) selected to match the capacity (e.g., in bits and/or bytes) of each of the cache lines of the one or more caches 556 such that there is a one-to-one correspondence between the blocks and the cache lines. As will be explained in greater detail, each block of the data 130 may be entirely filled by the data 130 therein, while at least a subset of the blocks of the encrypted data 530 may be less than entirely filled by the encrypted data 530 therein. To be clear, the size of the blocks is not changed as a result of the compression of the data 130 therein, only the amount of storage space within the blocks that is occupied by the data 130 is changed as a result of the compression of the data 130 therein. Following such compression of the data 130 within such a block, the storage space within that block that is no longer occupied by the data 130 therein may then be occupied by the metadata 535 for that block.

Turning to FIG. 3A, a block of the data 130 that is to be stored within the volatile storage 561 as a corresponding block of the encrypted data 530 may first proceed through the compressor 5542 where the data 130 therein may or may not be compressed, as will shortly be described. Then, regardless of whether compression is performed, that block may proceed through the encrypter 5543 where the data 130 in either its compressed or uncompressed form is encrypted to generate the corresponding block of encrypted data 530. As also depicted, a block of the encrypted data 530 that is retrieved from the volatile storage 561 may first proceed through the decrypter 5544 where the encrypted data 530 in either a compressed or uncompressed form is decrypted to begin to recreate its corresponding block of data 130. Then, that block may proceed through the decompressor 5545 where the now decrypted data is decompressed if it is not already in an uncompressed state to complete the recreation of the corresponding block of data 130.

More specifically, and as depicted, the security subsystem 554 may include a compressor 5542 to selectively compress the data 130 contained within a block. As also depicted, the compressor 5542 may include a measurer 5541 to take a measure of the data 130 within the block. In various embodiments, such taking of a measure may occur either before or after compression by the compressor 5542 in instances where such compression is performed (e.g., such a measure may be taken of the "plaintext" of the data 130 either before or after it is compressed). Alternatively or additionally in other various embodiments, such taking of a measure may occur either before or after encryption by the encrypter 5543 (e.g., such a measure may be taken of either the "plaintext" of the data 130 before encryption or of the "ciphertext" of the encrypted data 530 after encryption). As previously discussed, any of a variety of types of measure may be taken in preparation for checking integrity at a later time, including and not limited to, a checksum, a hash, a cryptographic hash, etc. Again, where a cryptographic hash is taken, the cryptographic hash may be any of a variety of types of cryptographic hash, including and not limited to, SHA-1, SHA-2, SHA-3 or SHA-HMAC.

The compressor 5542 may determine whether or not to compress the data 130 within that block. As will be depicted and explained in greater detail, the basis of such selectivity in whether or not to compress the data 130 within each block may be a determination made by the compressor 5542 of whether it is possible to compress the data 130 within that block sufficiently to make available enough storage space within that block to store any metadata 535 that may be generated for that block therein. If the compressor 5542 is able to compress the data 130 within a block to such a sufficient degree, then it may do so, and fill some of the storage space cleared within the block by such compression with at least the integrity metadata 5351 indicative of the measure taken of the data 130 of that block prior to compression and/or the compression metadata 5532 associated with the compression of the data 130 of that block. However, if the compressor 5542 is not able to compress the data 130 within that block to such a sufficient degree, then the compressor 5542 may refrain from compressing that data 130 within that block, at all, and may store the integrity metadata 5531 within the metadata storage 553 (at least temporarily). The compressor 5542 may also store a smaller form of the compression metadata 5532 within the metadata storage 553 where the smaller form thereof may include only an indication that no compression was performed on the data 130 within that block.

In some embodiments, the compressor 5542 may be capable of employing more than one type of compression, and may select the type of compression based on the degree to which each type is able to compress the data 130 within a block. Again, since various characteristics of the data 130 within each block may differ from one block to another, one type of compression may be more effective in compressing the data 130 within one block, while another type of compression may be more effective in compressing the data 130 within another block. Also, once again, different types of compression may generate compression metadata 5532 requiring different amounts of storage space to be stored. Thus, the compressor 5542 may select one of multiple types of compression to compress the data 130 within a particular block based on which type is able to compress that data 130 sufficiently to make available sufficient storage space within that block to accommodate the amount of compression metadata 5352 generated by that type of compression, as well as any integrity metadata 5351 and/or any encryption metadata 5353 that may also be generated. In such embodiments, the compression metadata 5352 may include an indication of which type of compression was used to compress the data 130 within that block. In the interests of minimizing the latency by which blocks of the data 130 propagate through the security subsystem 554, the compressor 5542 may simultaneously compress the data 130 within a block using multiple different types of compression, and may then select one of those types of compression based on which one(s) of those types of compression are able to compress the data 130 within that block sufficiently, as just described. Again, if none of the types of compression are able to compress the data 130 sufficiently within a particular block, then the compressor 5542 may not choose any of those types of compression, and may allow the data 130 within that block to remain uncompressed prior to its encryption, thereby effectively refraining from compressing the data 130 within that block, at all.

As depicted, the security subsystem 554 may include an encrypter 5543 to encrypt the data 130 within a block of data 130 to generate corresponding encrypted data 530 within a corresponding block of encrypted data 530, regardless of whether that data 130 therein was compressed by the compressor 5542. Where the data 130 within a block was compressed by the compressor 5542 such that sufficient storage space exists within the block to also store the metadata 535, the encrypter 5543 may encrypt at least the data 130 in its compressed form to generate corresponding encrypted data 530. In embodiments, where there is integrity metadata 5351 and/or compression metadata 5352 that is generated and stored in the block alongside the data 130 in its compressed form, such integrity metadata 5351 and/or the compression metadata 5352 may be encrypted along with the data 130 in its compressed form to generate the corresponding encrypted data 530. In such embodiments, if there is any encryption metadata 5353 that is generated, it may be stored in unencrypted form by the encrypter 5543 within the block alongside the encrypted data 530. Alternatively, where the data 130 within a block was not compressed by the compressor 5542 such that no storage space has been cleared by compression within that block for metadata 535, the encrypter 5543 may encrypt the data 130 in its uncompressed form within that block to generate the corresponding encrypted data 530. In embodiments in which any integrity metadata 5351 is generated, such integrity metadata 5351 may simply remain stored within metadata storage 553. Again, although no compression was performed, there may still be compression metadata 5352 generated that may be made up of a single bit indication that no compression was performed, and such compression metadata 5352 may also be stored within the metadata storage 553.

However, in other embodiments where the data 130 within a block is not able to be compressed and some amount of integrity metadata 5351 and/or compression metadata 5352 is generated, such metadata 5351 and/or 5352 may stored within an additional block for storage, and the encrypter 5543 may also encrypt such metadata 5351 and/or 5352 within that other additional block. In such embodiments, if there is any encryption metadata 5353 that is generated, it may be stored in unencrypted form by the encrypter 5543 within that block alongside the encrypted form of such integrity metadata 5351 and/or compression metadata 5352. As was previously mentioned, in various embodiments, the measure taken by the measurer 5541 for later use in verifying integrity may be taken at any of various stages in generating a corresponding block of encrypted data 530 from a block of data 130. It should be noted that such a measure may include one or more pieces of metadata 5351, 5352 and/or 5353 that may be stored within the other additional block (which may depend on which stage the measure is taken at). It is envisioned that the quantity of bits occupied by metadata 535 within a block may be considerably less than the quantity of bits occupied by the data 130 within a block, even after compression. Thus, the blocks used to store metadata 535 (regardless of which types of metadata are included therein) may be used to store metadata 535 associated with multiple blocks of encrypted data 530, to make more efficient use of the storage space therein.

Turning to FIG. 3B and as previously discussed, the type of encryption used may be any of a variety of types of encryption. In some embodiments, the security credentials 534 provided to the security subsystem 554 may include one or more values (e.g., a value that is unique to each processor component 550 and/or to each security controller 400 that is manufactured) that may serve as base value(s) from which one or more other values may be derived that, in turn, may then be employed as inputs to the encryption performed by the encrypter 5543 as part of an approach to avoiding the possibility of exposing the one or more values of the security credentials 534. The one or more other values generated from the security credentials 534 may be employed as encryption key(s), a seed(s) for random number generation, etc., for use by the encrypter 5543. Indeed, it may be that a different one of these values may be randomly selected for use by the encrypter 5543 for the encryption of the data 130 within each block, and that encryption metadata 5353 is generated to include an indicator of which of those different values was randomly selected to perform such encryption for each block.

Alternatively or additionally, in some embodiments, a physical address of the location within the volatile storage 561 at which a block of encrypted data 530 is to be stored may be used as an input to the encryption of the data 130 within the corresponding block of data 130 by the encrypter 5543. Again, by way of example, where XTS is the type of encryption used, the physical address may serve as the tweak input thereto. As previously discussed, this may be deemed desirable as a mechanism to defeat malware attacks that involve moving around portions of the encrypted data 530 within the volatile storage 561. Also, as a result of such use of physical addresses, if two blocks contain identical data 130 that is encrypted to generate two corresponding blocks of encrypted data 530, the fact that each will have a different physical address associated with a different location within the volatile storage 561 will result in the encrypted data 530 within each of those two corresponding blocks of encrypted data 530 being different. Stated differently, the encryption performed by the encrypter 5543 may be given a spatial characteristic based on such use of physical addresses that may further thwart any effort made to decrypt the encrypted data 530.

As familiar to those skilled in the art, it may be that the one or more processor cores 555, the one or more caches 556 and/or one or more other components of the processor component 550 may employ and exchange addresses having a width in bits that enables a relatively wide range of addresses to be specified. In contrast, the storage capacity able to provided by any part of the storage 560 (e.g., the volatile storage 561) may be far fewer bytes than could possibly occupy such a wide range of addresses. By way of example, and as depicted in FIG. 3B, such components within the processor component 550 as one of the caches 556 and the encrypter 5543 may exchange addresses that are 64 bits wide, but the address bus that reaches the storage controller 565*a* may be only 36 bits wide, since that enables addressing up to 64 gigabytes of storage space within the volatile storage 561, which may be deemed to be more than sufficient. Thus, it may be that one or more of the uppermost address bits of the 64 bit wide addressing capability within the processor component 550 remain effectively unused in specifying actual storage locations. In some embodiments, such uppermost address bits may be employed by routines made up of executable instructions to provide additional input values that may specify one of multiple types of encryption and/or encryption values (e.g., keys, seeds for random number generation, etc.) employed by the encrypter 5543, while the lower address bits may specify the storage location(s) at which portions of the data 130 may be stored as corresponding portions of encrypted data 530. Effectively, through such a mechanism, associations may be made between ranges of addresses selected by such uppermost bits and different types of encryption and/or different encryption values used as inputs. Alternatively or additionally, such uppermost bits may be included in the physical address that serves as a tweak input to XTS encryption in embodiments in which XTS encryption is the type of encryption that is used.

Memory allocation instructions and/or other instructions may allow such uppermost bits to be specified as a way of providing an ability to make such selections. Alternatively or additionally, such uppermost bits may be generated during address translation from virtual addresses to physical addresses where an address translator may associated particular combinations of bit values within the uppermost bits with different processes, different threads of execution, different routines and/or different virtual machines (VMs) within which different routines (including operating systems) may be executed. As a result, if two different processes store the same data, the resulting encrypted data will not be the same, and knowledge of the values of the uppermost bits associated with each process will be necessary to perform decryption. Stated differently, where different processes use different values for the upper address bits such that each process actually provides a differing input to the encryption, neither process will be able to decrypt the encrypted data of the other as any attempt to do so will trigger a failure in the verification of data integrity. This may be used to provide a form of security between processes. Further, whatever values are caused to be represented in such uppermost bits may be indicated within the encryption metadata 5353, which may remain unencrypted to enable subsequent decryption.

Also alternatively or additionally, in some embodiments, the encrypter 5543 may incorporate one or more counters to implement counter-mode encryption in which one of the inputs used by the encrypter 5543 may be incremented or decremented by one or more counters within the encrypter 5543 by a predetermined amount following each performance of encryption on the data 130 within a block of data 130. As familiar to those skilled in the art of encryption, a benefit of counter-mode encryption is that if two blocks containing identical data 130 that is encrypted to generate two corresponding blocks of encrypted data 530, the fact that one of the inputs to the encryption is incremented or decremented between the two performances of encryption will result in the encrypted data 530 within each of those two corresponding blocks of encrypted data 530 being different. Stated differently, the encryption performed by the encrypter 5543 may be given a temporal characteristic based on such use of counter(s) that may further thwart any effort made to decrypt the encrypted data 530. Further, the counter values used may be indicated within the encryption metadata 5353, which may remain unencrypted to enable subsequent decryption. It should be noted that such use of counters may be combined with the above-described use of physical addresses to impart both temporal and spatial characteristics to the encryption performed by the encrypter 5543.

In some embodiments, the encrypter 5543 may be capable of employing more than one type of encryption, and may randomly select the type of encryption to employ in encrypting the data 130 within each block of data 130. In such embodiments, encryption metadata 5353 may be generated to include an indication of which type of encryption was used in generating the encrypted data 530 within each block of encrypted data 530 generated from a corresponding block of data 130.

Returning to FIG. 3A, following the performance of encryption by the encrypter 5543, the resulting block of encrypted data 530 may be sent from the security subsystem 554 of the processor component 550 to the storage controller 565*a*, and the storage controller 565*a* may store that block of encrypted data 530 at its intended location within the volatile storage 561. Where it was possible for the data 130 within the corresponding block of data 130 to be sufficiently compressed to clear storage space therein for the metadata 535, then there may be no metadata 535 associated with that block of encrypted data 530 that needs to be separately stored. Stated differently, that block of encrypted data 530 may contain all of the information required to enable the security subsystem 554 to subsequently decrypt and decompress the encrypted data 530 therein and thereby recreate the original uncompressed and unencrypted data 130.

However, where it was not possible for the data 130 within the corresponding block of data 130 to be sufficiently compressed to clear storage space therein for any metadata 535 that may be generated, then the metadata 535 associated with that block of encrypted data 530 must be separately stored. Stated differently, the metadata 535 needs to be stored in a manner that enables its subsequent retrieval for use by the security subsystem 554 to subsequently decrypt, decompress and/or check the integrity of the resulting encrypted data 530 and thereby recreate the original uncompressed and unencrypted data 130. As earlier stated, it may be in some embodiments that the metadata 535 for each block of encrypted data 530 occupies a small enough quantity of bits and/or bytes such that it may be deemed practical to continue storing the metadata 535 within the metadata storage 553 of the processor component 550 for each block of encrypted data 530 in which the metadata 535 could not be stored. However, it may be in other embodiments that the metadata 535 for each block of encrypted data 530 simply occupies too many bits and/or bytes to be deemed practical to so continue to store the metadata 535 within the metadata storage 553. Instead, in such other embodiments, storage of the metadata 535 within the metadata storage 553 may continue only during the generation of each block of encrypted data 530 from a corresponding block of data 130. Thus, in such other embodiments, the metadata 535 for at least the blocks of the encrypted data 530 in which the metadata 535 could not be stored may be separately stored within the volatile storage 561. In some embodiments, a portion of the volatile storage 561 may be allocated solely to the storage of metadata 535 for at least the blocks of encrypted data 530 in which the metadata 535 could not be stored. Also, in such embodiments, it may be that such separate storage of metadata 535 may be cached by the one or more caches 556, and/or by an entirely separate cache (not shown).

As depicted, the security subsystem 554 may include a decrypter 5544 to decrypt the encrypted data 530 within a block of encrypted data 530 as part of recreating the corresponding data 130, regardless of whether that encrypted data 530 was also compressed, or not (e.g., whether that encrypted data 530 was generated from data 130 that was in compressed form or uncompressed form). Where the encrypted data 530 within the block of encrypted data 530 is compressed, that block contains all of any metadata 535 that may have been generated that is associated with that block such that no other metadata 535 need be retrieved from any form of storage. If there is any encryption metadata within that metadata 535, then the decrypter 5544 may then use that encryption metadata 5353 to decrypt the encrypted data 530 within that block. However, where the encrypted data 530 within that block of encrypted data 530 is not compressed, then any metadata 535 that may have been generated that is associated with that block may need to be retrieved by decrypter 5544 from elsewhere. As previously discussed, in embodiments in which the metadata 535 for each block of encrypted data 530 is relatively small in size (e.g., occupies relatively few bits and/or bytes) such that it is deemed practical to store that metadata 535 within the metadata storage 553, the decrypter 5544 may retrieve that metadata 535 associated with that block from the metadata storage 553. Alternatively, where the metadata 535 for each block of encrypted data 530 occupies a sufficient number of bits and/or bytes as to be deemed more practical to store within a separate location within the volatile storage 561, the metadata 535 associated with that block of encrypted data 530 may be retrieved from the volatile storage 561 just as that block was. Again, such separate storage of metadata 535 within the volatile storage 561 may also be cached by the one or more caches 556, or by an entirely separate cache (not shown). Upon its retrieval, the metadata 535 associated with that block may be temporarily stored within the metadata storage 553 for use in converting the block of encrypted data 530 into a recreated corresponding block of data 130, and the decrypter 5544 may retrieve any encryption metadata 5353 that may exist within the metadata 535 from the metadata storage 553.

As depicted, the security subsystem 554 may include a decompressor 5545 to selectively decompress the now unencrypted form of the encrypted data 530 within the block of encrypted data 530 as part of continuing to recreate the corresponding data 130. Where the now unencrypted form of the encrypted data 530 within that block is compressed, that block contains all of the metadata 535 associated with that block, and the decompressor 5545 may then use the compression metadata 5352 included within that metadata 535 to decompress the now unencrypted form of the encrypted data 530 within that block. However, where the now unencrypted form of the encrypted data 530 within that block is not compressed, then the decompressor 5545 may refrain from performing decompression as the now unencrypted form of the encrypted data 530 is already a recreation of the corresponding data 130.

As also depicted, the decompressor 5545 may include a verifier 5546 to verify the integrity of the now recreated data 130 by verifying that it is identical to the original data 130 from which the encrypted data 530 of the block of encrypted data 530 was earlier generated. The verifier 5546 may retrieve the integrity metadata 5351 from the same source from which the decrypter 5544 may have retrieved any encryption metadata 5353 that may exist (e.g., from either within that block or from the metadata storage 553), and may then use the integrity metadata 5351 to perform the verification. More specifically, the verifier 5546 may take a measure of the now recreated data 130 that is the same type of measure as the measure that was earlier taken of the original data 130 from which the encrypted data 530 was earlier generated. The verifier 5546 may then compare the two measures, and if they are identical, then the newly recreated data 130 is the same as the original data 130, and there has been no loss of integrity such that the newly recreated data 130 may be accepted and used. However, if the two measures do not match, then there has been a loss of integrity, the newly recreated data 130 is not accepted for use, and the security subsystem 554 may cause the processor component 550 to generate a data integrity error exception and/or interrupt.

In some embodiments, as a measure to reduce the latency of recreating the data 130 from the perspective of the one or more processor cores 555, the newly recreated data 130 may be provided to the one or more processor cores 555 prior to completion of verification of integrity thereof by the verifier 5546. If the verifier 5546 determines that integrity has been lost, then the one or more processor cores 555 may be caused to cease any use of the newly recreated data 130 that may already be in progress.

It should be noted that various actions may be taken in response to the generation of an exception or interrupt by the processor component 550 based on a determination by the verifier 5546 that the integrity of a block of data 130 as stored in the form of a retrieved corresponding block of encrypted data 530 may have been compromised. By way of example, the processor component 550 may be caused to execute an interrupt or exception handler routine that may cause the processor component 550 to trigger a reinitialization of the processing device 500 in an effort to purge malware that may be presumed to have caused such loss of data integrity. Alternatively or additionally, the processor component 550 may operate the network interface 590 to transmit a signal to another device via the network 999 indicating that such an instance of loss of data integrity has occurred and/or to disconnect the processing device 500 from the network 999. Also alternatively or additionally, the security subsystem 554 may provide an indication of the loss of data integrity to the security controller 400 (if present) to enable the security controller 400 to take any of such actions and/or to take other actions in response.

Given such a wide range of possible responses, it may be deemed desirable to, as part of initializing the processing device 500, initialize all storage locations of the volatile storage 561 and/or one or more other portions of the storage 560 with value(s) that provide an indication that no data has yet been stored at those storage locations. Such a measure would then prevent an instance of random values being retrieved from storage locations at which no data was ever stored and then misinterpreted as being data that has been corrupted as a result of random bit values mistaken by the verifier 5546 as legitimate integrity metadata 5351. By way of example, all storage locations within the volatile storage 561 may be initialized to 0 values for every bit and/or byte, and the decrypter 5544 (and/or another portion of the security subsystem 554) may be capable of recognizing instances of retrieving all 0's from the volatile storage 561 as an indication of having attempted to retrieve data from a storage location at which no data has yet been stored.

In various embodiments, the processor component 150 may include any of a wide variety of commercially available processors. Further, this processor component may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage 160 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of the network interface 190 may employ any of a wide variety of signaling technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 4A:
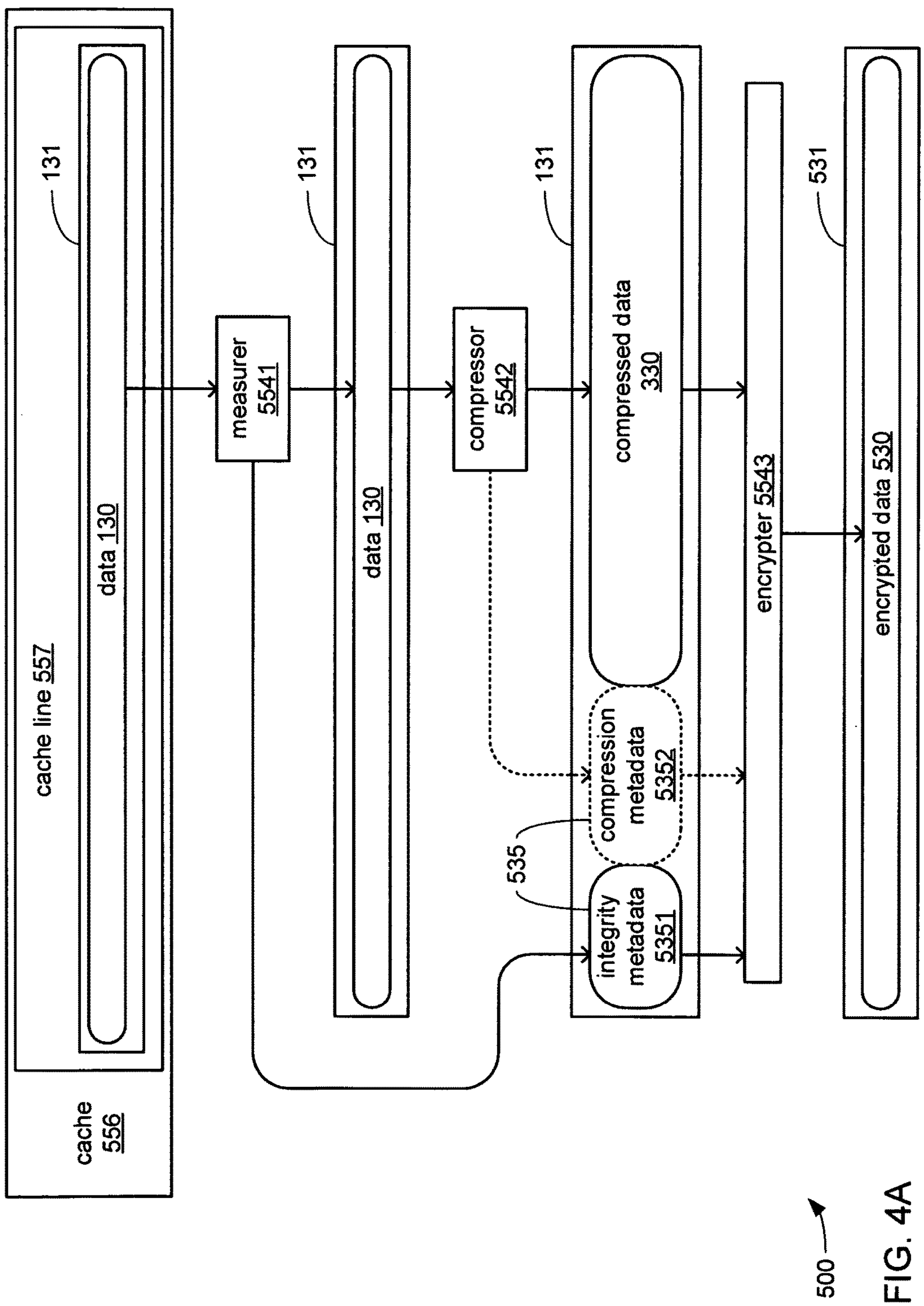
FIGS. 4A and 4B, together, illustrate an example embodiment of conversion between blocks of encrypted and unencrypted data.
Figure 4B:
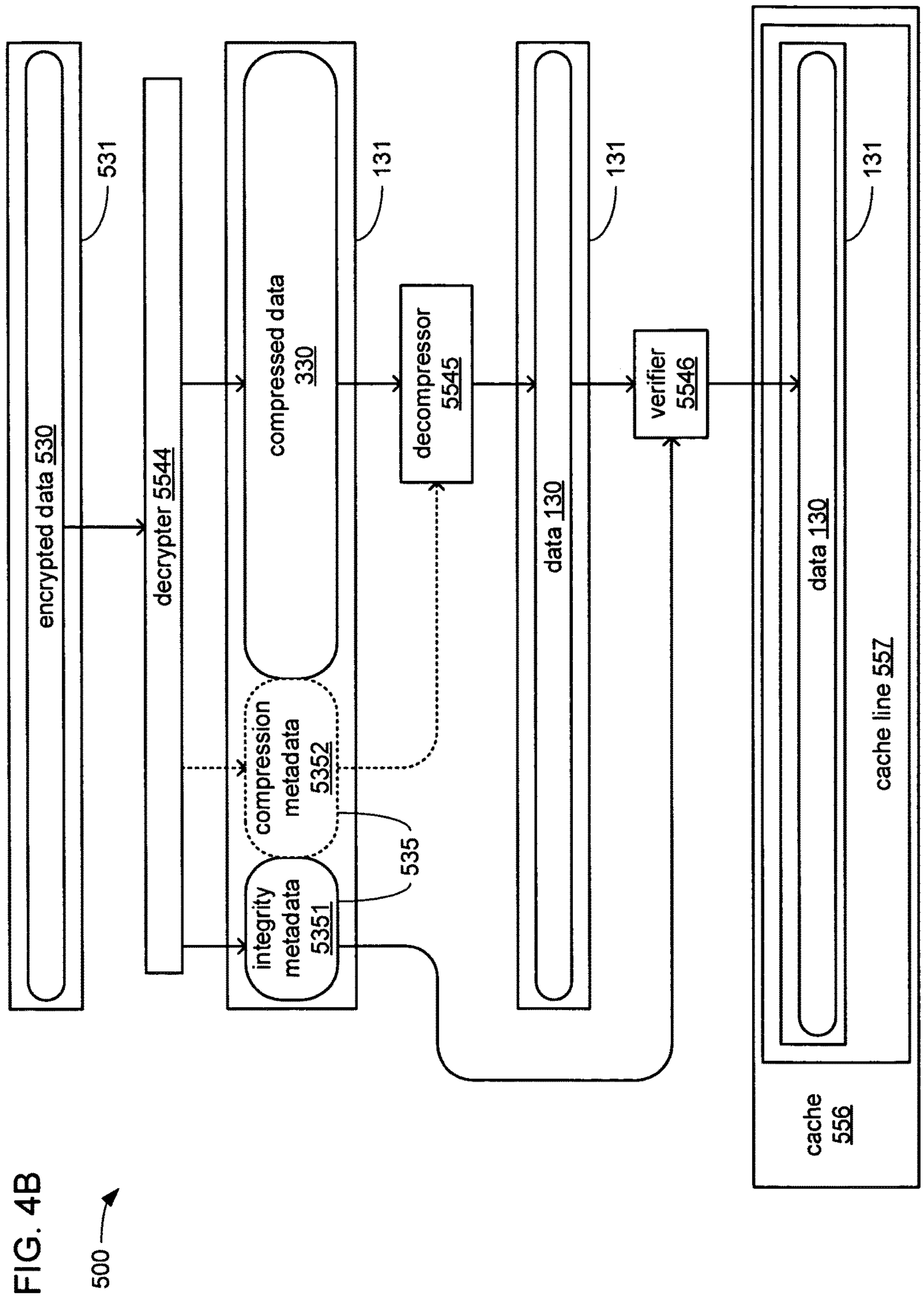

FIGS. 4A and 4B, together, depict aspects of an example of corresponding conversions by the security subsystem 554 between blocks of data 130 and blocks of encrypted data 530. More specifically, FIG. 4A depicts aspects of deriving a block 531 of encrypted data 530 from a block 131 of data 130 that is neither compressed or encrypted, and FIG. 4B depicts aspects of the reverse in which a block 131 of data 130 is recreated from a block 531 of encrypted data 530. FIGS. 4A and 4B are intended to present what may be deemed as a relatively simplistic so called "naive" scenario in which, for the sake of discussion, it is presumed that the data 130 within each block 131 is always compressible to a degree sufficient to enable any metadata 535 that may be generated to be stored alongside the data 130 in its compressed form. Thus, there may be no compression metadata generated, at all, as there is no need to store even an indication of whether or not the data 130 within each block 131 is compressed to generate a corresponding block 531 of encrypted data 530. Again, as has been discussed, the size (e.g., in bits and/or bytes) of the block 131 does not change as a corresponding block 531 is derived therefrom, but the amount of storage space occupied within a block 531 by the encrypted data 530 within that block 531 may be less than the space occupied within a corresponding block 131 by the corresponding data 130 within that block 131 as a result of compression of that corresponding data 130. Also again, the size of the blocks 131 and 531 may be selected to match the storage capacity of the cache lines within the one or more caches 556.

Turning to FIG. 4A, a block 131 of data 130 may exactly fill a cache line 557 of a one of the caches 556, and that block 131 of data 130 may be evicted from that cache line 557 such that it is to be stored within the volatile storage 561. However, as has been discussed, the security with which that block 131 of data 130 may be so stored may be enhanced by first converting it into a corresponding block 531 of encrypted data 530.

Upon receipt of the block 131 of data 130 by the security subsystem 554 from a cache 556 (or from elsewhere, such as the graphics controller 585), the measurer 5541 may take a measure of at least a portion of the data 130 within the block 131 in its still uncompressed form. In so doing, the measurer 5541 generates integrity metadata 5351 made up of an indication of the measure so taken. As has been discussed, the integrity metadata 5351 may also indicate the type of the measure taken.

The compressor 5542 may then compress the data 130 within the block 131, thereby generating compressed data 330 therefrom within the block 131. In so doing, the compressor 5542 clears the storage space needed to store at least the integrity metadata 5351 generated by the measurer 5541 within the block 131 alongside the compressed data 330. As has been discussed, if the compressor 5542 generates any compression metadata 5352 as a result of compressing the data 130 to generate the compressed data 330 (such as compression metadata 5352 indicating a type of compression used), then the compressor 5542 may also store such compression metadata 5352 alongside the compressed data 330.

The encrypter 5543 may then encrypt the combination of the compressed data 330, the integrity metadata 5351 and any compression metadata 5352 that may also have been generated during compression to generate the corresponding block 531 of encrypted data 530. In this example, it is presumed that the encrypter 5543 does not generate any encryption metadata 5353. The block 531 of encrypted data 530 may then be stored within the volatile storage 561.

Turning to FIG. 4B, a block 531 of encrypted data 530 may be retrieved from the volatile storage 561 to fill a cache line 557 of a one of the caches 556. However, as has been discussed, the security measures used in generating the block 531 of the encrypted data 530 from a corresponding original block 131 of data 130 in its original form may need to be undone by converting the block 531 of encrypted data 530 back into a corresponding block 131 of data 130 in a manner that essentially recreates that corresponding original block 131 from the block 531.

Upon receipt of the block 531 of encrypted data 530 from the volatile storage 561 (or from elsewhere, such as another portion of the storage 560), the decrypter 5544 may decrypt the encrypted data 530 therein, thereby recreating the corresponding block 131 with a recreation of the corresponding compressed data 330 therein, along with at least the integrity metadata 5351. If the compressor 5542 had generated any compression metadata 5352 as part of compressing the original data 130, then such compression metadata 5352 may be provided by the decryption performed by the decrypter 5544 alongside the integrity metadata 5351 within the recreated block 131.

The decompressor 5545 may then decompress the compressed data 330 to recreate the data 130 in its original uncompressed and unencrypted form within the block 131. In so doing, the decompressor 5545 may make use of any compression metadata 5352 that may have been made available by the decryption of the encrypted data 530.

The verifier 5546 may then take a measure of the recreated data 130. The type of measure so taken is of the same type originally taken of the original data 130 by the measurer 5541, and in some embodiments, that type may be indicated in the integrity metadata 5531. The verifier 5546 may then compare the value of this new measure to the value of the original measure indicated in the integrity metadata 5351. If the measures are identical, then the verifier may determine that the integrity of the data 130 of the original block 131 has been maintained throughout the storage thereof as part of the encrypted data 530 of the block 531. However, if the measures are not identical, then the verifier 5546 may determine that such integrity has been lost, and may trigger the processor component 550 to generate a data integrity error, which may cause execution of one or more other routines (not shown) to take any of a variety of actions in response to such loss of data integrity, as has been described.

Referring back to both FIGS. 4A and 4B, although the taking of a measure of the data 130 and the compression of the data 130 are depicted and discussed as occurring a particular order, and although the decompression of the compressed data 330 and the taking of another measure for verification of integrity are depicted and discussed as occurring in a particular corresponding order, it should be noted that other embodiments are possible in which these operations may be performed in a different order. More specifically, in other embodiments, the compression of the data 130 make occur before the taking of a measure such that the measurer 5541 may take a measure of the compressed data 330, and the taking of another measure may occur before the decompression such that the verifier 5546 may take the additional measure of the recreation of the compressed data 330.

Also, although what has been depicted and discussed herein centers on conversion, storage and retrieval of blocks 131 and 531 having a capacity (e.g., in bits and/or bytes) equal to that of one of the cache lines 557 of a cache 556, other embodiments are possible in which the blocks 131 and 531 may have a larger capacity than that of a single one of the cache lines 557. More specifically, in other embodiments, each of the blocks 131 and 531 may have a capacity (in bits and/or bytes) that is double or quadruple that of one of the cache lines 557. This may be deemed desirable in support of more efficient retrieval of data from the volatile storage 561 in bursts that may be of a size that is able to fill two or four cache lines. This may also be deemed desirable to support speculative filling of cache lines to reduce occurrences of one or more of the processor cores 555 having to wait to receive a next executable instruction. In such embodiments, where data 130 within one of the cache lines 557 is evicted, it may be that a block stored within the volatile storage 561 at a range of addresses that includes those to be overwritten by the evicted data 130 may need to be retrieved, decrypted and/or decompressed to enable an appropriate portion to be overwritten before that block is again compressed and/or encrypted, and then stored back at its location within the volatile storage 561.

Figure 5A:
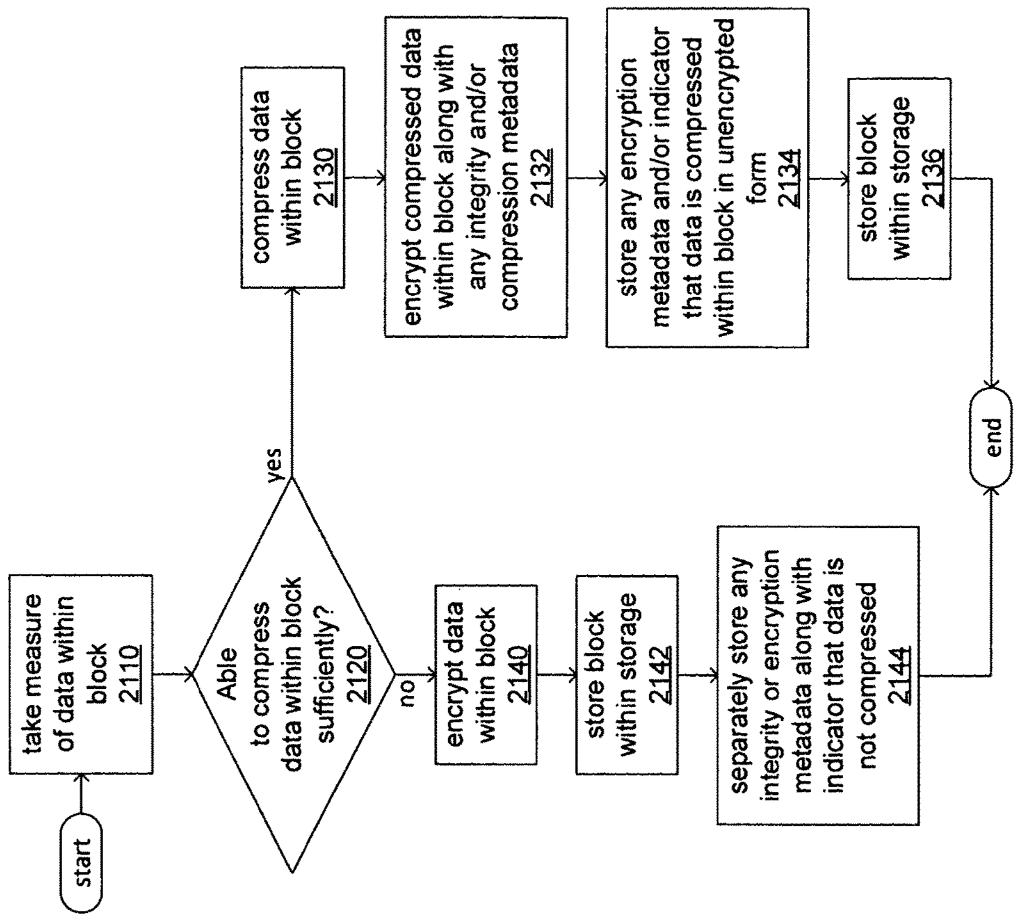
FIGS. 5A and 5B, together, illustrate corresponding logic flows according to an embodiment.
Figure 5B:
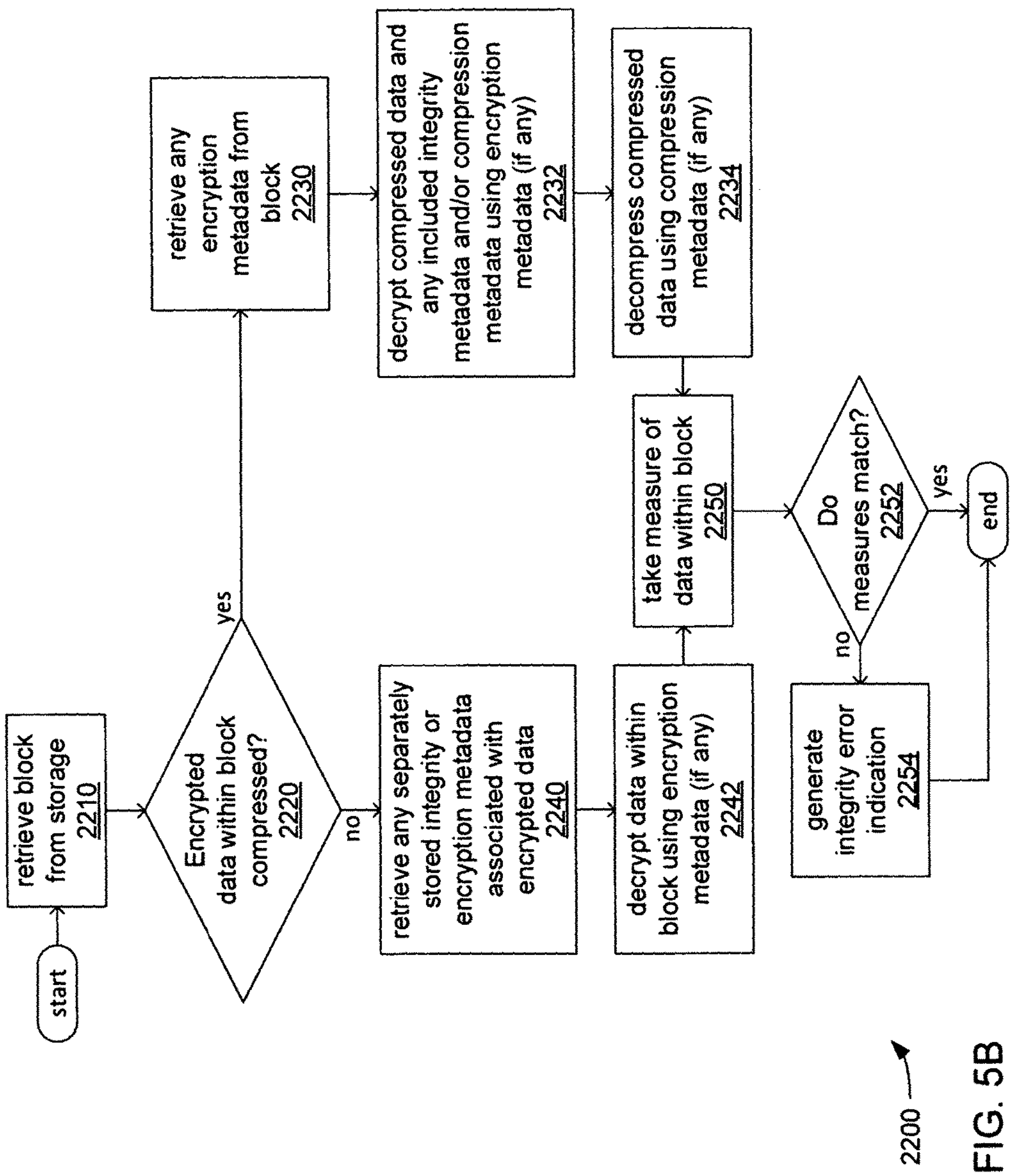

FIGS. 5A and 5B, together, illustrate an embodiment of corresponding logic flows 2100 and 2200. Each of the logic flows 2100 and 2200 may be representative of some or all of the operations executed by one or more embodiments described herein. More specifically, each of the logic flows 2100 and 2200 may illustrate operations performed by the processor component 550 in executing at least the security microcode 540, and/or performed by various hardware components within the processing device 500. In particular, the logic flow 2100 is focused on operations to convert a block 131 of data 130 into a block 531 of encrypted data 530 for storage within the volatile storage 561 (or within another portion of the storage 560), and the logic flow 2200 is focused on performing the converse of that conversion upon retrieving a block 531 of encrypted data 530 from such storage.

Turning to FIG. 5A, at 2110, a measuring component of a main processor component of a processing device (e.g., the measurer 5541 of the processor component 550 of the processing device 500) may take a measure of at least a portion of the data within a block of data (e.g., the data 130 within a block 131 of data 130). At 2120, a compression component of the main processor component (e.g., the compressor 5542) may perform a check of whether the data within that block is able to be compressed sufficiently to clear enough storage space within that block to store metadata (e.g., some combination of the integrity metadata 5351, the compression metadata 5352 and the encryption metadata 5353 that may be generated) associated with the conversion of that block of data into a corresponding block of encrypted data (e.g., a corresponding block 531 of encrypted data 530).

If, at 2110, such sufficient compression is possible, then at 2130, the compression component may so compress the data within that block. At 2132, an encryption component of the processor component (e.g., the encrypter 5543) may then encrypt the now compressed data within that block along with integrity metadata indicative of the measure taken by the measuring component and/or any compression metadata generated by the compression component from compressing the data. At 2134, the compression component may store an indicator within the block that the data is compressed and/or the encryption component may store any encryption metadata within the block in unencrypted form. At 2136, the processor component may store that block within a storage of the processing device (e.g., the volatile storage 561).

However, if at 2110, such sufficient compression is not possible, then at 2140, the encryption component may encrypt the still uncompressed data within that block. At 2142, the main processor component may store that block within the storage. At 2144, the measuring component may store integrity metadata indicative of the measure, the encryption component may store any encryption metadata, and/or the compression component may store an indication that the data is not compressed within in a separate metadata storage or within a separate location within the same storage into which the block is stored (e.g., within the metadata storage 553 or a different location within the volatile storage 561).

Turning to FIG. 5B, at 2210, a main processor component of a processing device (e.g., the processor component 550 of the processing device 500) may retrieve a block of encrypted data from a storage of the processing device (e.g., a block 531 of encrypted data 530 from the volatile storage 561). At 2220, a decryption component of the main processor component (e.g., the decrypter 5544) may perform a check of whether the encrypted data within that block is compressed.

If, at 2220, the encrypted data within that block is compressed, then at 2230, the decryption component may retrieve from the block any encryption metadata that may be present within the block in unencrypted form (e.g., the encryption metadata 5353). At 2232, the decryption component may decrypt the encrypted (and compressed) data to recreate the compressed data from which the encrypted data was generated (e.g., the compressed data 330), along with any integrity metadata and/or compression metadata that may have been encrypted along with that compressed data (e.g., the integrity metadata 5351 and/or the compression metadata 5352). The decryption component may do so using the encryption metadata, if there is any. At 2234, a decompression component of the main processor component (e.g., the decompressor 5545) may decompress the now decrypted (but still compressed) data using the compression metadata, if there is any, to recreate the original block of the original data in unencrypted and uncompressed form (e.g., the block 131 of data 130).

However, if at 2220, the encrypted data within that block is not compressed, then at 2240, the decryption component may retrieve any integrity metadata and/or encryption metadata that may be separately stored (e.g., within the metadata storage 553 or a different location within the volatile storage 561). It should be noted, however, that in some embodiments, the decryption component may have already retrieved such metadata from such another storage location as part of determining whether the encrypted data is compressed. At 2242, the decryption component may decrypt the encrypted (but not compressed) data using the encryption metadata, if there is any, to recreate the original block of the original data in unencrypted and uncompressed form.

Following either the decompression at 2234 or the decryption at 2242, a verification component of the processor component (e.g., verifier 5546) may take a measure of the recreated data at 2250. At 2252, the verification component may perform a check of whether the measure taken at 2250 matches the measure indicated in the integrity metadata as having been taken of the original data before generation of the encrypted data therefrom. If the values of the two measures do not match, then the main processor component may generate an indication of an integrity error at 2254.

Figure 6A:
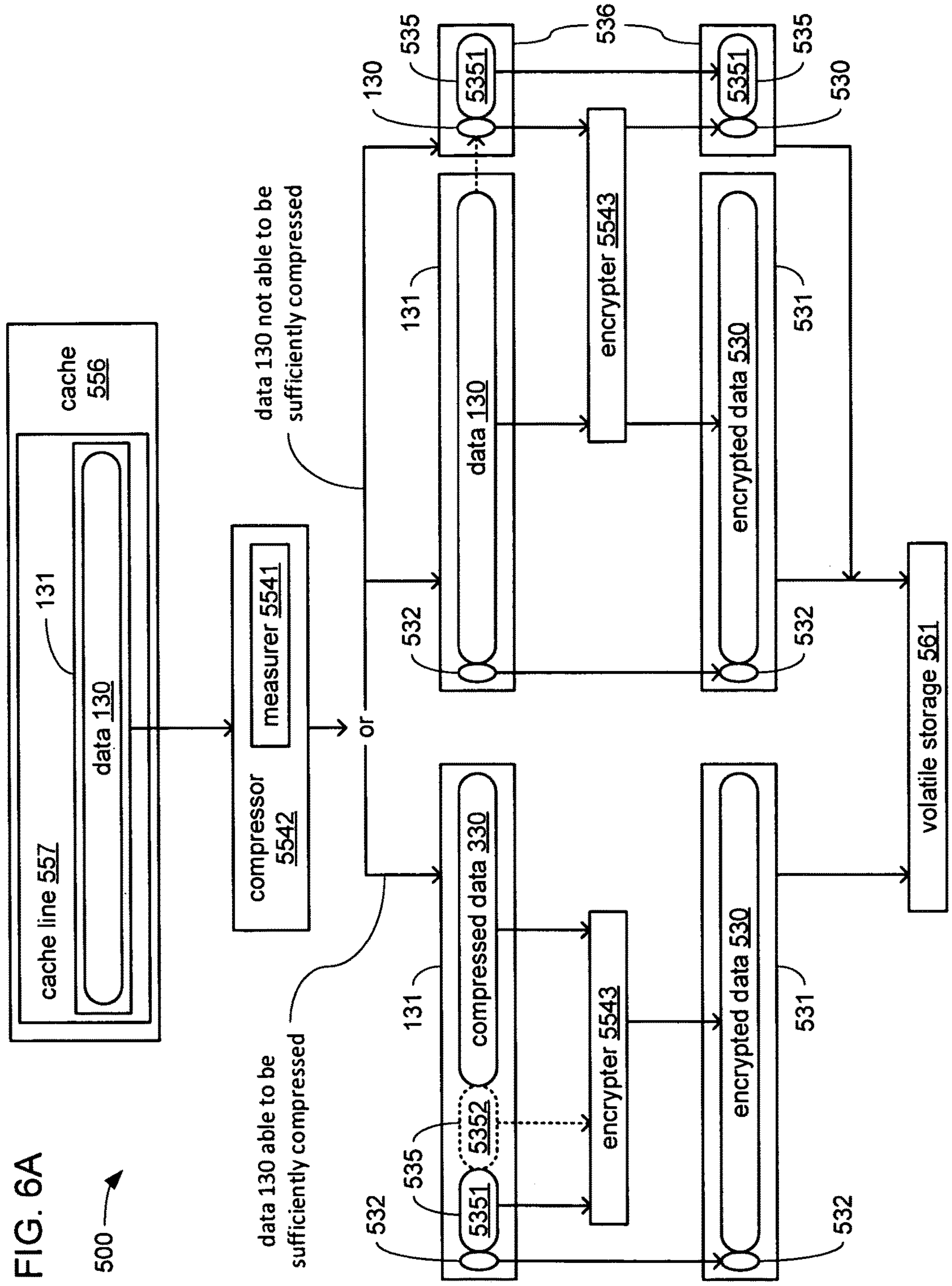
FIGS. 6A and 6B, together, illustrate another example embodiment of conversion between blocks of encrypted and unencrypted data.
Figure 6B:
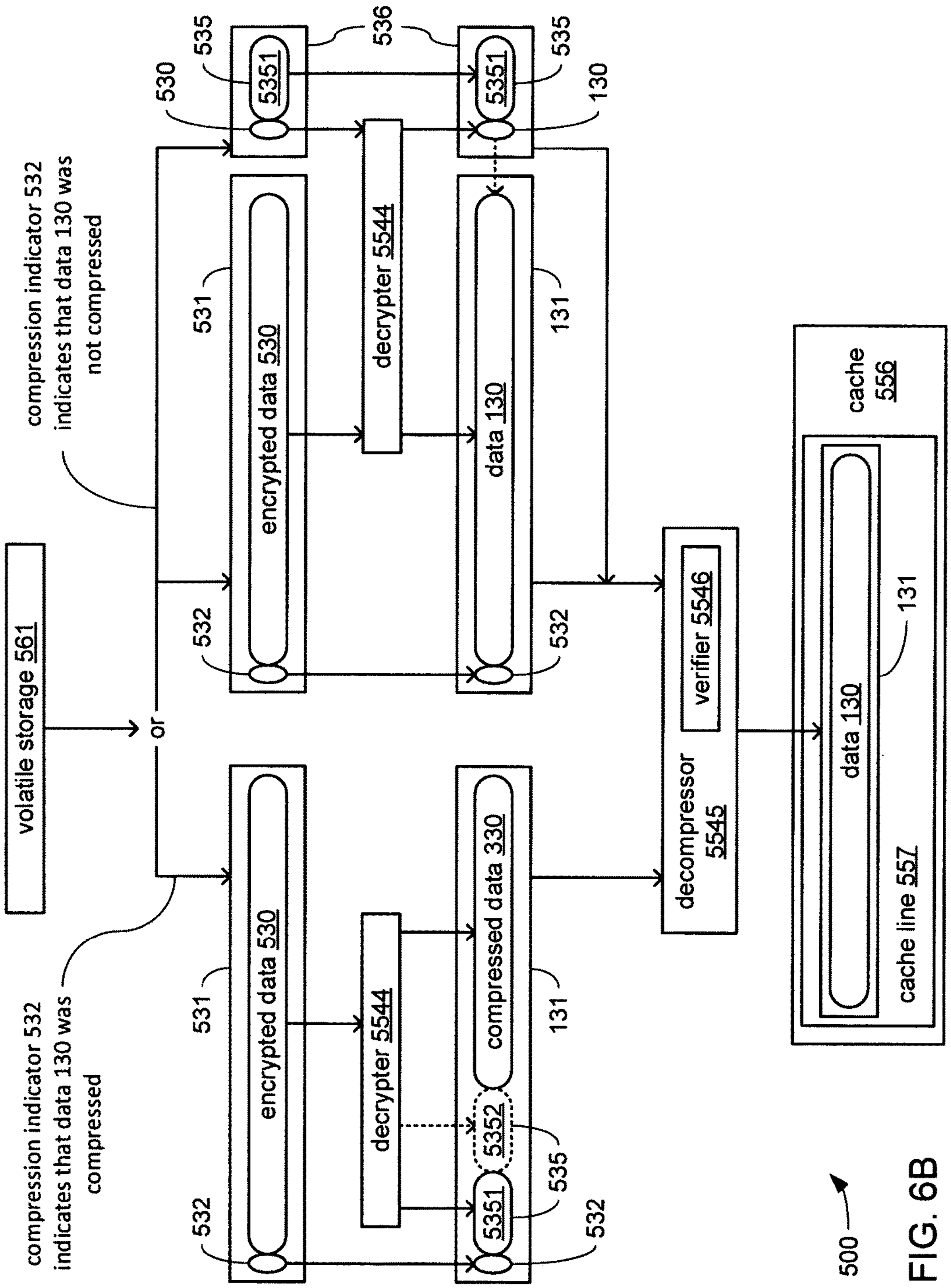

FIGS. 6A and 6B, together, depict aspects of another example of corresponding conversions by the security subsystem 554 between blocks of data 130 and blocks of encrypted data 530. More specifically, FIG. 6A depicts aspects of deriving a block 531 of encrypted data 530 that may also be compressed from a block 131 of data 130 that is neither compressed or encrypted, and FIG. 6B depicts aspects of the reverse in which a block 131 of data 130 is recreated from a block 531 of encrypted data 530.

Turning to FIG. 6A, a block 131 of data 130 may exactly fill a cache line 557 of a one of the caches 556, and that block 131 of data 130 may be evicted from that cache line 557 such that it is to be stored within the volatile storage 561. However, as has been discussed, the security with which that block 131 of data 130 may be so stored may be enhanced by first converting it into a corresponding block 531 of encrypted data 530.

Again, upon receiving the block 131 of data 130 from a cache 556 (or elsewhere, such as the graphics controller 585) the measurer 5541 may take a measure of at least a portion of the data 130 within the block 131 in its still uncompressed form. In so doing, the measurer 5541 generates integrity metadata 5351 made up of an indication of the measure so taken. Also, the compressor 5542 may determine whether or not the data 130 within the block 131 is able to be compressed sufficiently to clear enough storage space within the block 131 for the storage therein of the integrity metadata 5351, any compression metadata 5352 that may be generated by the compressor 5542, and/or a compression indicator 532 that may be made up of a single-bit binary value indicating whether the data 130 was compressed.

If the compressor 5542 determines that the data 130 within the block 131 is able to be compressed to such a degree, then the compressor 5542 may so compress the data 130 within the block 131, thereby generating compressed data 330 therefrom and clearing such storage space within the block 131. The compressor 5542 may then store within that cleared storage space within the block 131 the compression indicator 532, the integrity metadata 5351 and/or any compression metadata 5352 that may have been generated by the compressor 5542 from compressing the data 130 to generate the compressed data 330.

The encrypter 5543 may then encrypt the compressed data 330 along with the integrity metadata 5351 and/or any compression metadata 5352 that may have been generated and stored within the block 131 alongside the compressed data 330 as part of completing the conversion of the block 131 of data 130 into the corresponding block 531 of encrypted (and compressed) data 530. The encrypter 5543 may not include the compression indicator 532 in such encryption in order to enable its value to be read at a later time to provide an indication as to whether the data 130 was compressed as part of generating the block 531 of encrypted data 530. Then, the now generated block 531 of encrypted data 530 may be stored within the volatile storage 561.

However, if the compressor 5542 determines that the data 130 within the block 131 is not able to be compressed to a degree sufficient to clear enough space within the block 131 to store the integrity metadata 5351, any compression metadata 5352 that may be generated by the compressor 5542, and the compression indicator, then the compressor 5542 may refrain from compressing the data 130 within the block 131, at all. Instead, the compressor 5542 may store a copy of one or more bits of the data 130 within an additional block 536 along with the integrity metadata 5351 that includes the indication of the measure taken by the measurer 5541. Since no compression is performed, there may be no compression metadata 5352 generated by the compressor 5542 to be stored. The compressor 5542 may then replace the one or more copied bits of the data 130 with the compression indication 532. It should be noted that regardless of whether the compressor 5542 compresses the data 130 within the block 131, or not, the compression indicator 532 may be stored at the same one or more bit positions within the block 131 to provide an indication of whether such compression was performed.

The encrypter 5543 may then encrypt the entirety of the data 130 (e.g., both of the portions stored within the block 131 and the additional block 536) to generate the encrypted data 530, which may be split among the block 131 and the additional block 536 in a manner similar to the data 130. In some embodiments, the encrypter 5543 may also encrypt the integrity metadata 5531 along with the entirety of the data 130 such that the integrity metadata 5531 would be part of the resulting encrypted data 530. Regardless of whether the integrity metadata 5531 is so included in the encryption, the performance of the encryption may the conversion of the block 131 of data 130 into the corresponding block 531 of encrypted (but uncompressed) data 530 along with the additional block 536. Again, the encrypter 5543 may not include the compression indicator 532 in such encryption in order to enable its value to be read at a later time to provide an indication as to whether the data 130 was compressed as part of generating the block 531 of encrypted data 530, as well as the additional block 536. Then, the now generated block 531 of encrypted data 530 may be stored within the volatile storage 561. Also, the now completed additional block 536 may also be stored within the volatile storage 561 in what may be a separate portion of the volatile storage 561 allocated for such additional blocks 536. It should be noted that, in some embodiments, the additional block 536 may be of identical size to the blocks 131 and 531 such that the additional block 536 may store portions of encrypted data 530 and integrity metadata 5351 associated with multiple blocks 131 of data 130 that have been converted to corresponding blocks 531 of encrypted data 530.

Turning to FIG. 6B, a block 531 of encrypted data 530 may be retrieved from the volatile storage 561 to fill a cache line 557 of a one of the caches 556. However, as has been discussed, the security measures used in generating the block 531 of the encrypted data 530 from a corresponding original block 131 of data 130 in its original form may need to be undone by converting the block 531 of encrypted data 530 back into a corresponding block 131 of data 130 in a manner that essentially recreates that corresponding original block 131 from the block 531.

As has been discussed, differences may arise in such a recreation of that corresponding original block 131 of data 130 depending on whether the data 130 within the original block 131 was compressed in generating the block 531 of encrypted data 530, as indicated by the compression indicator 532 within the block 531. Again, where data 130 within a block 131 is compressed to generate the encrypted data 530 within a block 531, metadata 535 associated with that block 531 is stored within that block 531 such that it need not be retrieved from any other source. In contrast, where the data 130 within the original block 131 was not compressed to generate the encrypted data 530 within the block 531, metadata 535 associated with that block 531 is not within that block 531 and must be retrieved from an additional block 536 that may be stored within the volatile storage 561. Such retrieval of an additional block 536 may be routinely performed close in time to when the block 531 of encrypted data 530 is retrieved from the volatile storage 561 without waiting for a determination as to whether the contents of the additional block are needed to minimize any delay in instances where those contents are needed. Thus, upon the retrieval of a block 531 of encrypted data 530 from the volatile storage 561 (or from elsewhere, such as another portion of the storage 560), the decrypter 5544 may first analyze the compression indicator 532 to determine whether the encrypted data 530 within the block 531 is compressed.

Where the compression indicator 532 indicates that the encrypted data 530 within that block 531 was generated from compressed data 330 that was generated by compressing data 130, the decrypter 5544 may decrypt the encrypted data 530 within the block 531, thereby recreating the corresponding block 131 with corresponding recreated compressed data 330 stored therein alongside the integrity metadata 5351 and/or any compression metadata 5352 that may be present. Again, the indication provided by the compression indicator 532 that compression was used in generating the block 531 of encrypted data 530 means that there is no other portion of the encrypted data 530 within an additional block 536.

The decompressor 5545 may then employ any such compression metadata within the recreated block 131 to decompress the compressed data 330, and thereby recreate the data 130 in its uncompressed form. In so doing, the decompressor 5545 may recreate the corresponding original block 131 in which the now recreated data 130 fully occupies all of the storage space within that block 131.

However, where the compression indicator 532 indicates that the encrypted data 530 within that block 531 was generated from the data 130 in its original uncompressed form, the decrypter 5544 may decrypt the entire encrypted data 530 made up of the portions from within both the block 531 and the additional block 536. Again, the indication provided by the compression indicator 532 that compression was not used in generating the block 531 of encrypted data 530 means that there is another portion of the encrypted data 530 within an additional block 536 that is to be included in the decryption. In this way, the decrypter 5544 recreates the corresponding block 131 with a portion of the corresponding data 130 in uncompressed form stored within the block 131 and a portion thereof stored within the additional block 536.

Due to the lack of use of compression indicated by the compression indicator 532, the decompressor 5545 may refrain from performing any decompression. Instead, the decompressor 5545 may retrieve the portion of the recreated data 130 stored within the additional block 536 and replace the compression indicator 532 within it within the now recreated block 131, thereby completing the recreation of the data 130 within the recreated block 131.

Regardless of whether decompression is required to be performed by the decompressor 5545 to generate the recreated data 130 within the recreated block 131, the verifier 5546 may then take a measure of the recreated data 130. The type of measure so taken is of the same type originally taken of the original data 130 by the measurer 5541, and in some embodiments, that type may be indicated in the integrity metadata 5531. The verifier 5546 may then compare the value of this new measure to the value of the original measure indicated in the integrity metadata 5351. If the measures are identical, then the verifier may determine that the integrity of the data 130 of the original block 131 has been maintained throughout the storage thereof as part of the encrypted data 530 of the block 531. However, if the measures are not identical, then the verifier 5546 may determine that such integrity has been lost, and may trigger the processor component 550 to generate a data integrity error, which may cause execution of one or more other routines (not shown) to take any of a variety of actions in response to such loss of data integrity, as has been described.

FIGS. 7A-B and 8A-B, together, depict aspects of still another example of corresponding conversions by the security subsystem 554 between blocks of data 130 and blocks of encrypted data 530. More specifically, FIGS. 7A and 7B, together, depict aspects of deriving a block 531 of encrypted data 530 that may also be compressed from a block 131 of data 130 that is neither compressed or encrypted, and FIGS. 8A and 8B, together, depict aspects of the reverse in which a block 131 of data 130 is recreated from a block 531 of encrypted data 530.

Figure 7A:
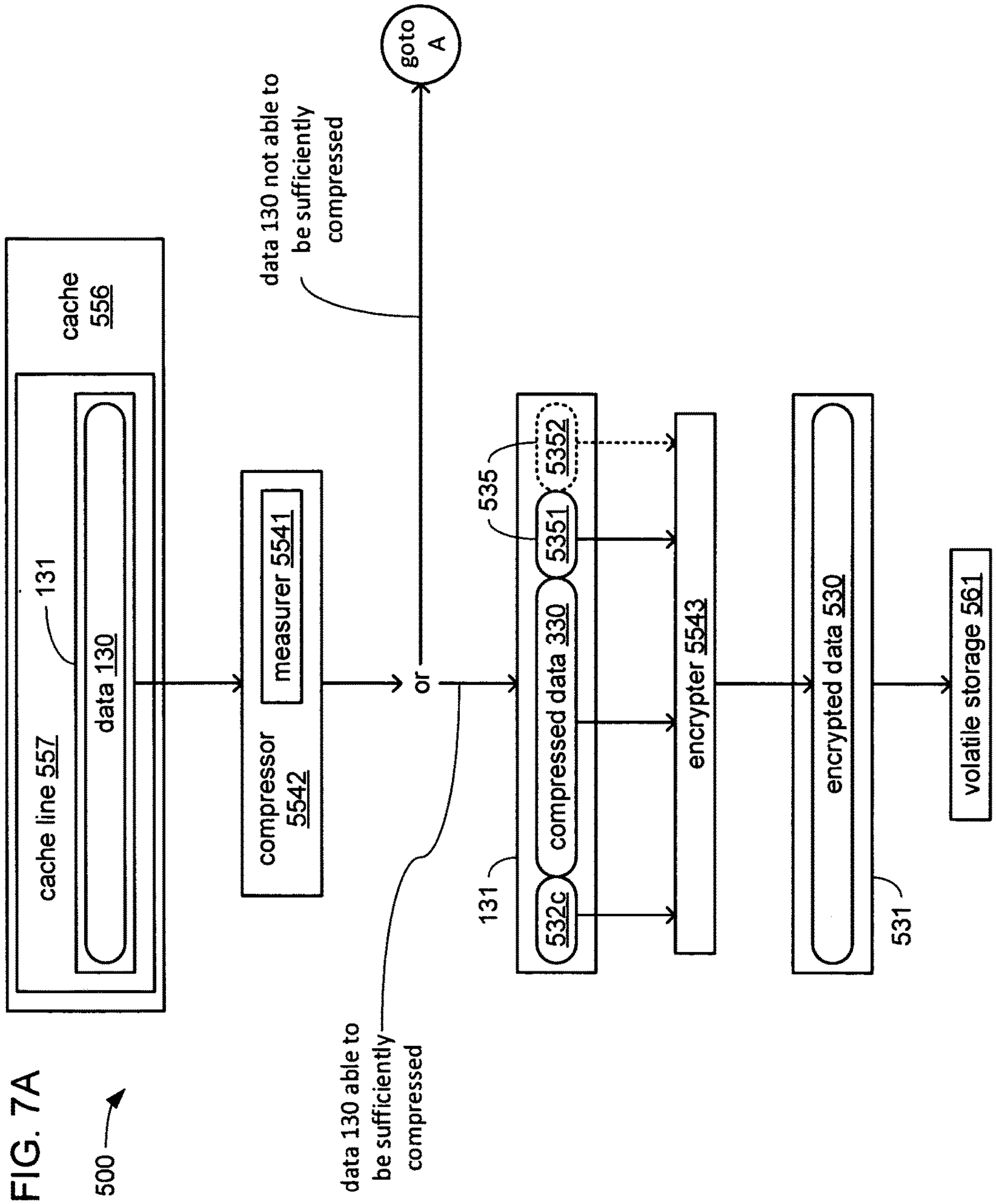
FIGS. 7A and 7B, together, illustrate an example embodiment of conversion from a block of unencrypted data to a block of encrypted data.
Figure 7B:
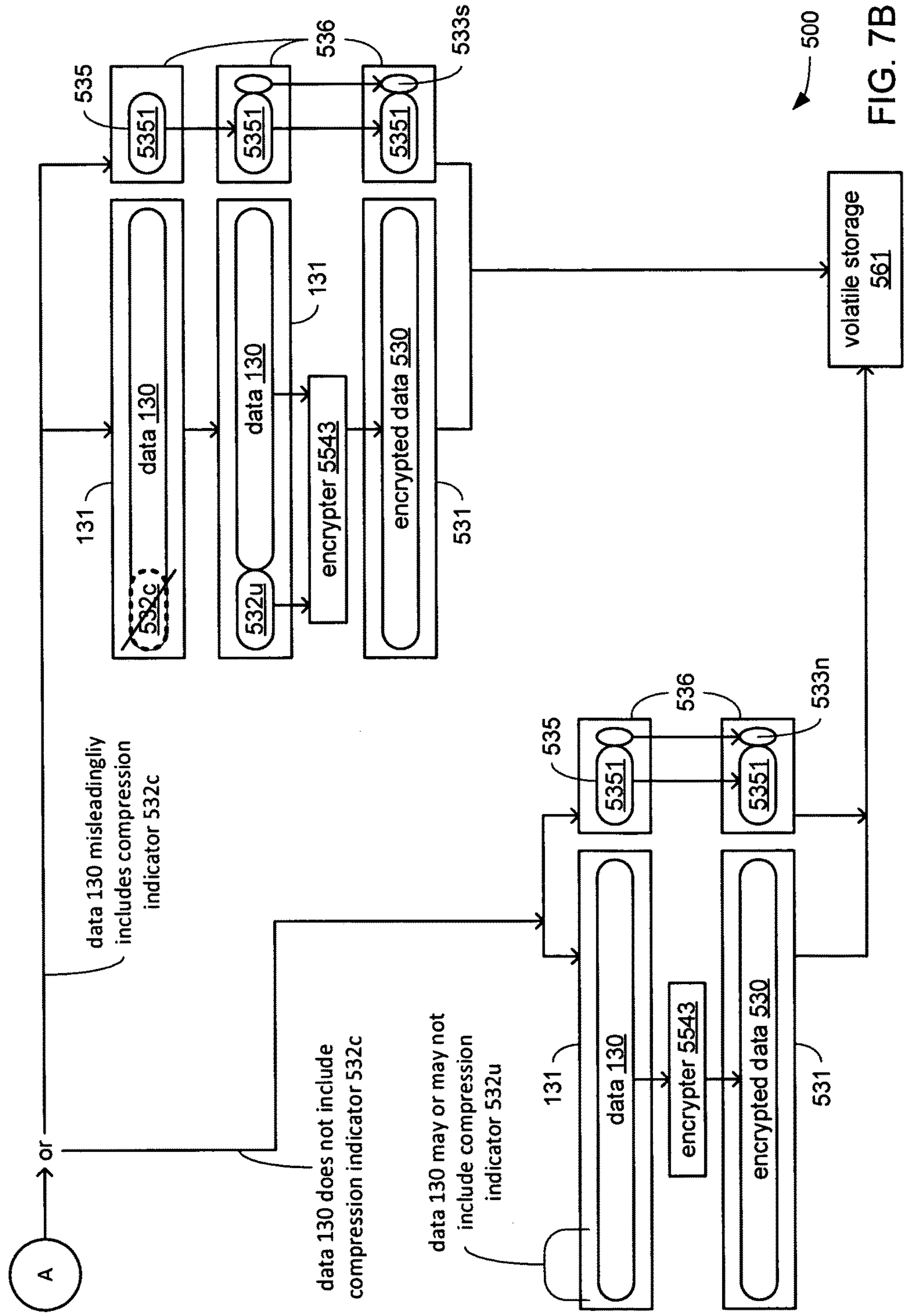

Turning to FIG. 7A, a block 131 of data 130 may exactly fill a cache line 557 of a one of the caches 556, and that block 131 of data 130 may be evicted from that cache line 557 such that it is to be stored within the volatile storage 561. Again, upon being received from a cache 556 (or elsewhere, such as the graphics controller 585), the measurer 5541 may take a measure of the data 130 within the block 131 in its still uncompressed and unencrypted form, thereby generating integrity metadata 5351 made up of an indication of the measure so taken. Then, the compressor 5542 may determine whether or not the data 130 within the block 131 is able to be compressed sufficiently to clear enough storage space within the block 131 for the storage therein of any metadata that is to be included (e.g., the integrity metadata 5351) and a compression indicator 532*c* that indicates that the data 130 was compressed.

It should be noted that, unlike the compression indicator 532 depicted in FIGS. 6A-B, which may occupy only one bit, the compression indicator 532*c* depicted in FIGS. 7A-B and 8A-B may occupy a nibble, an entire byte or more. Also unlike the compression indicator 532 of FIGS. 6A-B, which was allocated a bit location within a block 531 of encrypted data 530 that was not shared with any other piece of information, the compression indicator 532*c* of FIGS. 7A-B and 8A-B may be allocated multiple bits within a block 531 that, on some occasions, may be occupied by a portion of encrypted data 530, instead. Such sharing of those allocated bits may be deemed desirable to avoid the need to displace a portion of an uncompressed form of encrypted data 530 from within a block 531 and to an additional block 536, thereby necessitating the retrieval of both blocks 531 and 536 to retrieve encrypted data 530 that is not compressed (as was depicted in FIGS. 6A-B). To enable such sharing, the compression indicator 532*c* indicating that the data 130 was compressed and a corresponding compression indicator 532*u* indicating that the data 130 remains uncompressed may each have a bit width selected to minimize the statistical possibility of a portion of encrypted data 530 that may occupy those allocated bits having a bit value within those bits that matches either of the selected values for the compression indicators 532*c* or 532*u*. As will shortly be explained, a portion of encrypted data 530 may still be replaced within a block 531 where that portion would otherwise occupy such allocated bits and have a value that matches one of the selected values such that there is a risk of misinterpretation of what is stored within the block 531 during conversion back to a recreated corresponding block 131 of data 130.

If the compressor 5542 determines that the data 130 within the block 131 is able to be compressed to such a degree, then the compressor 5542 may so compress the data 130 within the block 131, thereby generating compressed data 330 therefrom and clearing the storage space needed for storing such metadata 535 as may include the integrity metadata 5351 and/or any compression metadata 5352 that may be generated, along with the compression indicator 532*c* within the block 131. The compressor 5542 may then store such metadata 535 and the compression indicator 532*c* within the block 131. The encrypter 5543 may then encrypt the resulting combination of the compressed data 330, the compression indicator 532*c* and such metadata 535 as the integrity metadata 5351 and/or any compression metadata 5352 that may be generated as part of completing the conversion of the block 131 of data 130 into the corresponding block 531 of encrypted (and compressed) data 530. Then, the resulting block 531 of encrypted data 530 may be stored within the volatile storage 561.

However, if the compressor 5542 determines that the data 130 within the block 131 is not able to be compressed sufficiently to clear storage space within the block 131 to store both the compression indicator 532*c* and such metadata 535, then the compressor 5542 may refrain from compressing the data 130 within the block 131, at all. Instead, the compressor 5542 may store the integrity metadata 5351 within an additional block 536. The compressor 5542 may then check the portion of the data 130 that occupies the bit locations that are also allocated to the compression indicators 532*c* and 532*u* within the block 131 of data 130 to determine whether those bits of that portion match the selected value of the compression indicator 532*c* that serves to indicate that compression of the data 130 has been performed.

If there is no such match to the compression indicator 532*c* (e.g., if those bits of that portion match the selected value of the compression indicator 532*u* that serves to indicate that no such compression was performed, or match still some other value than that of the compression indicator 532*c*), then there is no false indication at that portion of the data 130 as having been compressed, and no need to substitute that portion of the data 130 with the other compression indicator 532*u* to provide a correct indication that the data 130 is not compressed. In response to there being no such match and no need for such a substitution, the compressor 5542 may store a substitution indicator 533*n* indicating that portion of the data 130 as having not been substituted with the compression indicator 532*u*. The encrypter 5543 may then encrypt the data 130, thereby completing the conversion of the block 131 of data 130 into the corresponding block 531 of encrypted data 530. In some embodiments, the encrypter 5543 may also encrypt the integrity metadata 5351 and the substitution indicator 533*n* within the additional block 536. Then, the newly generated block 531 of encrypted data 530 and the additional block 536 may both be stored within the volatile storage 561.

However, if those bits within that portion of the data 130 do match the selected value of the compression indicator 532*c*, then such a false indication that the data 130 has been compressed is being provided by that portion, and there is a need to substitute that portion of the data 130 with the other compression indicator 532*u* to provide a correct indication that the data 130 is not compressed. In response to there being such a match, and therefore such a need for such a substitution, the compressor 5542 may perform such a substitution. The compressor 5542 may also store a substitution indicator 533*s* indicating that portion of the data 130 as having been substituted with the compression indicator 532*u*. The encrypter 5543 may then encrypt the remaining unchanged portion of the data 130 within the block 131 together with the compression indicator 532*u*, thereby completing the conversion of the block 131 of data 130 into the corresponding block 531 of encrypted data 530. In some embodiments, the encrypter 5543 may also encrypt the integrity metadata 5351 and the substitution indicator 533*s* within the additional block 536. Then, the newly generated block 531 of encrypted data 530 and the additional block 536 may both be stored within the volatile storage 561. The encryption of such information within the additional block 536 may be deemed desirable to avoid exposing clues as to the contents of the block 531 of encrypted data 530, including what the presence of either of the substitution indicators 533*n* or 533*s* may reveal about the contents of the shared bits at which either of the compression indicators 532*c* or 532*u* may be located.

Figure 8A:
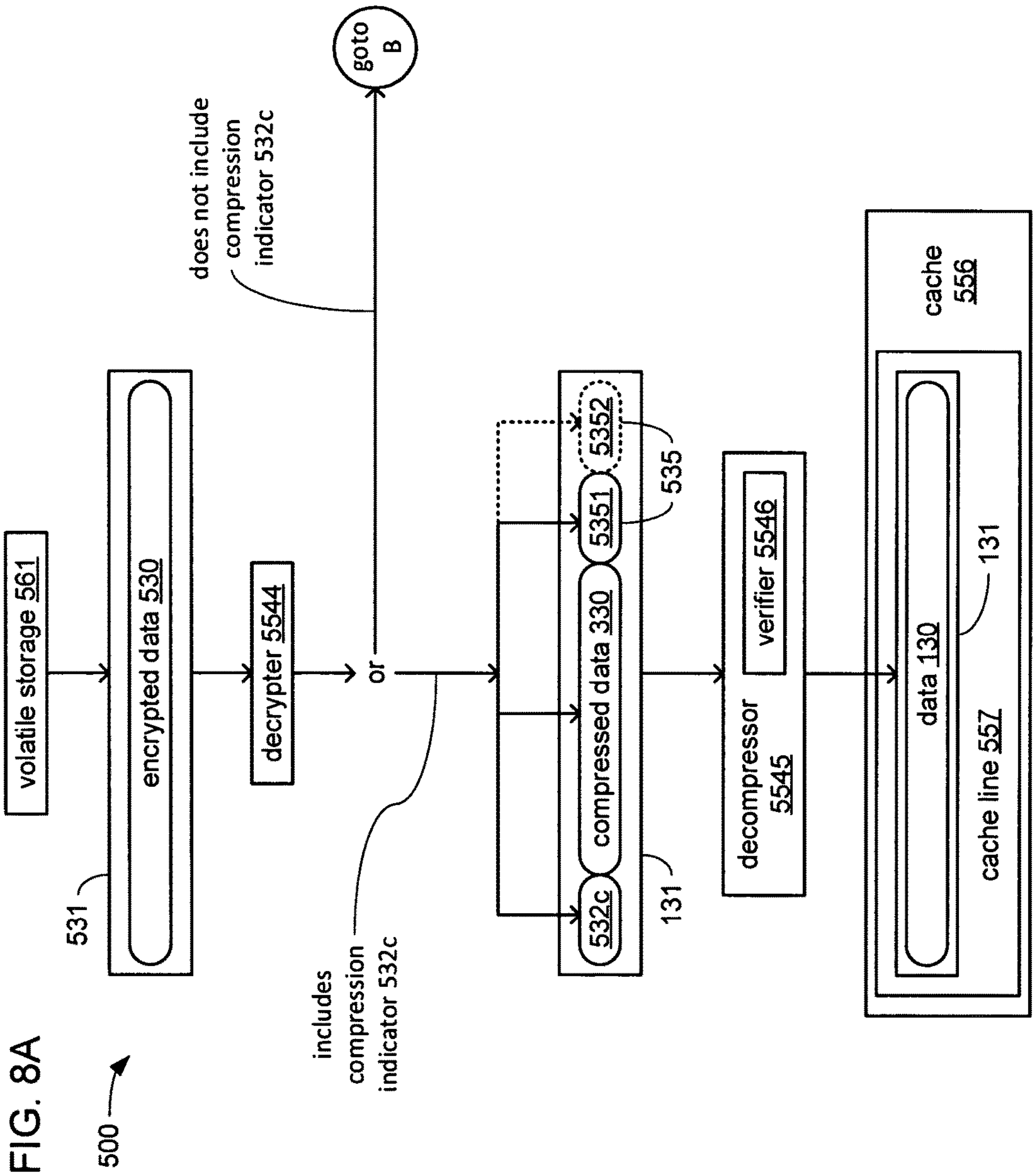
FIGS. 8A and 8B, together, illustrate an example embodiment of a reversal of the conversion of FIGS. 7A and 7B.

Turning to FIG. 8A, a block 531 of encrypted data 530 may be retrieved from the volatile storage 561 to fill a cache line 557 of a one of the caches 556. Upon the retrieval of a block 531 of encrypted data 530 from the volatile storage 561 (or from elsewhere, such as another portion of the storage 560), the decrypter 5544 may decrypt the encrypted data 530 within the block 531. Doing so may recreate the corresponding block 131 with either a recreation of corresponding compressed data 330 therein or with a recreation of at least a portion of corresponding data 130 in uncompressed and unencrypted form. The decompressor 5545 may then analyze the bits within the recreated block 131 allocated to be shared between a portion of the data 130 and one of the compression indicators 532*c* or 532*u* to determine which of these is present at the location of those bits. Again, the manner in which conversion of the block 531 of encrypted data 530 into a recreation of the corresponding block 131 of recreated data 130 proceeds may be determined based on what value occupies those bits.

If those bits are populated with a value that matches the selected value of the compression indicator 532*c* indicating that the original corresponding data 130 was compressed as part of generating the block 531 of encrypted data 530 therefrom, then the decompressor 5545 may determine that the recreated block 131 contains recreated compressed data 330. In response to that determination, the decompressor 5545 may decompress the compressed data 330 to recreate the corresponding data 130, thereby completing the recreation of the block 131 of data 130. In so doing, the decompressor 5545 may use any compression metadata 5352 that may also be included within the recreated block 131 alongside the compressed data 330. The verifier 5546 may then take a measure of the recreated data 130. The type of measure so taken is of the same type originally taken of the original data 130 by the measurer 5541, and in some embodiments, that type may be indicated in the integrity metadata 5531 retrieved from being stored alongside the compressed data 330 within the recreated block 131 before decompression. The verifier 5546 may then compare the value of this new measure to the value of the original measure indicated in the integrity metadata 5351. If the measures are identical, then the verifier may determine that the integrity of the data 130 of the original block 131 has been maintained throughout the storage thereof as part of the encrypted data 530 of the block 531. However, if the measures are not identical, then the verifier 5546 may determine that such integrity has been lost, and may trigger the processor component 550 to generate a data integrity error, which may cause execution of one or more other routines (not shown) to take any of a variety of actions in response to such loss of data integrity, as has been described.

Figure 8B:
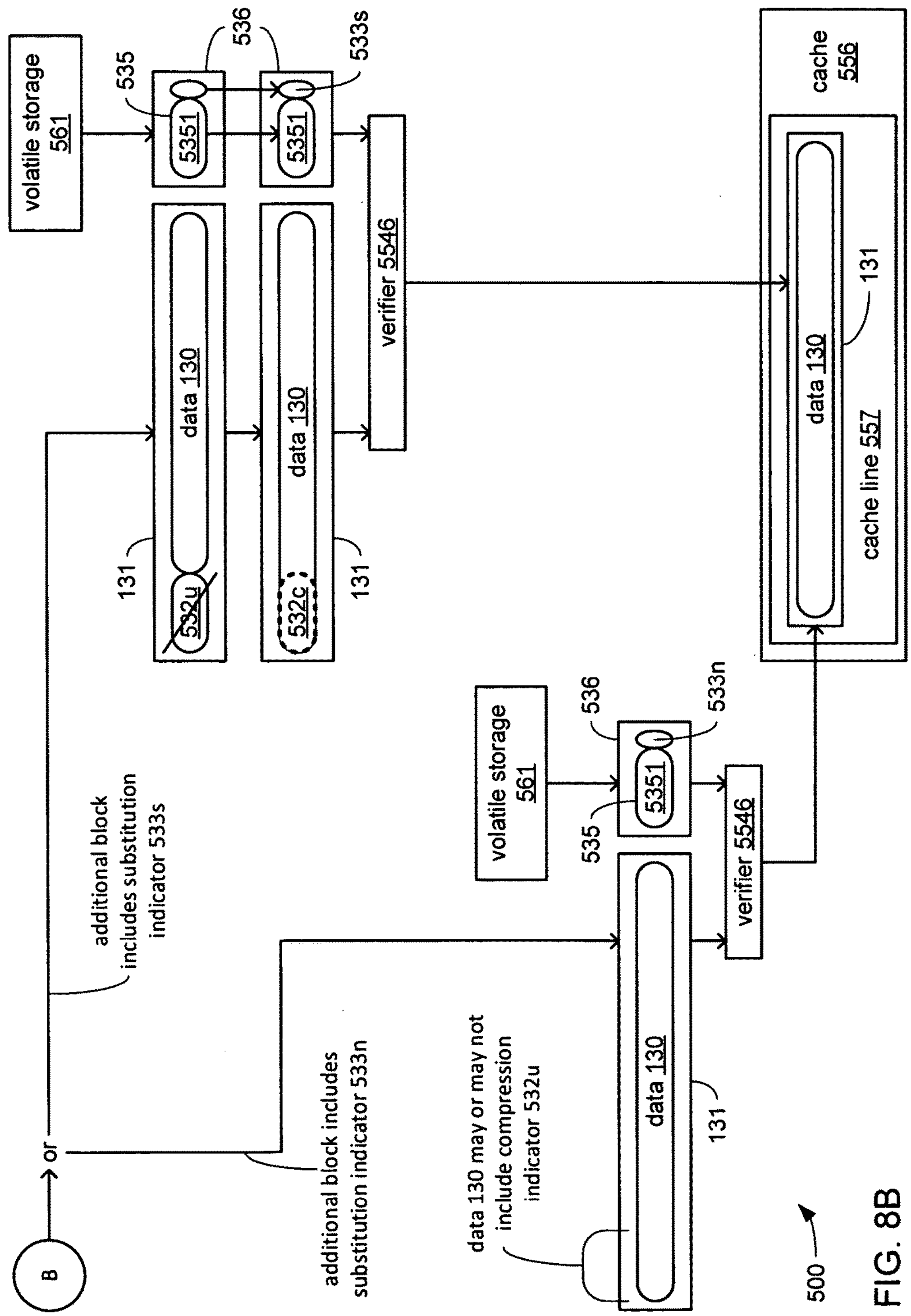

However, and turning to FIG. 8B, if those bits are populated with a value that matches the selected value of the compression indicator 532*u* indicating that the original corresponding data 130 was not compressed as part of generating the block 531 of encrypted data 530 therefrom, then the decompressor 5545 may determine that the recreated block 131 contains either a partial recreation or a complete recreation of the data 130 depending on whether a portion of the data 130 was substituted at the location of those bits. In response to that determination, the decompressor 5545 may access an additional block 536 that corresponds to the block 531 to determine whether the substitution indicator 533*n* or 533*s* is present therein. This access to that additional block 536 may trigger the retrieval of that additional block 536 in embodiments in which that additional block 536 is not already retrieved along with the block 531. If the substitution indicator 533*n* is present within the additional block 536, then no portion of the original data 130 was substituted with the selected value for the compression indicator 532*u*, and therefore, the recreated block 131 contains a recreation of the entirety of the data 130 such that conversion of the block 531 of encrypted data 530 into a recreation of the corresponding block 131 of data 130 has been completed. However, if the substitution indicator 533*s* is present within the additional block 536, then the portion of the original data 130 at the location of those bits was so substituted with the value of compression indicator 532*u* to replace a value at the location of those bits that matched the value of the compression indicator 532*c* to avoid providing a false indication of the original data 130 as having been compressed. In response to the presence of the substitution indicator 533*s* within that additional block 536, the decompressor 5545 may replace the value of the compression indicator 532*u* at the location of those bits with the value of the compression indicator 532*c* at the location of those bits, thereby completing the recreation of the corresponding block 131 of data 130 from the block 531 of encrypted data 530. The verifier 5546 may then take a measure of the recreated data 130. The type of measure so taken is of the same type originally taken of the original data 130 by the measurer 5541, and in some embodiments, that type may be indicated in the integrity metadata 5531 stored within that additional block 536. The verifier 5546 may then compare the value of this new measure to the value of the original measure indicated in the integrity metadata 5351. Again, if the measures are identical, then the verifier may determine that the integrity of the data 130 of the original block 131 has been maintained throughout the storage thereof as part of the encrypted data 530 of the block 531. However, if the measures are not identical, then the verifier 5546 may determine that such integrity has been lost, and may trigger the processor component 550 to generate a data integrity error.

However, and continuing with FIG. 8B, if those bits are populated with a value that does not match either of the selected values of either of the compression indicator 532*c* or 532*u*, then the decompressor 5545 may determine that the recreated block 131 contains a recreation of the entirety of the data 130 such that the recreation of the corresponding block 131 of data 130 from the block 531 of encrypted data 530 has already been completed. As a result, there may be no need for the decompressor 5545 to access the additional block 536. Given that the statistical probability of those bits holding a value that does not match either of the values for either of the compression indicators 532*c* or 532*u* is greater than the probability of those bits holding the value of one or the other of the compression indicators 532*c* or 532*u*, the additional block 536 will usually not need to be accessed as part of recreating the block 131 of the data 130. Stated differently, the only occasions on which the additional block 536 needs to be accessed as part of recreating the block 131 of data 130 is when those bits are occupied by a value matching the selected value of the compression indicator 532*u* such that the additional block 536 needs to be checked to determine which of the substitution indicators 533*n* or 533*s* are stored therein. As a result, the speed with which such recreation of blocks 131 of data 130 is performed is not usually decreased by the additional amount of time required to access a corresponding additional block 536. The verifier 5546 may then take a measure of the recreated data 130. The type of measure so taken is of the same type originally taken of the original data 130 by the measurer 5541, and in some embodiments, that type may be indicated in the integrity metadata 5531 stored within that additional block 536. While the generation of the recreated block 131 of data 130 may not have required accessing the additional block 536, use of the integrity metadata 5351 will require such access. Thus, if that additional block 536 had not already been accessed to generate the recreated block 131 of data 130, this access to that additional block 536 by the verifier 5546 may trigger the retrieval of that additional block 536 in embodiments in which that additional block 536 is not already retrieved along with the block 531. The verifier 5546 may then compare the value of this new measure to the value of the original measure indicated in the integrity metadata 5351. Again, if the measures are identical, then the verifier may determine that the integrity of the data 130 of the original block 131 has been maintained throughout the storage thereof as part of the encrypted data 530 of the block 531. However, if the measures are not identical, then the verifier 5546 may determine that such integrity has been lost, and may trigger the processor component 550 to generate a data integrity error.

Figure 9:
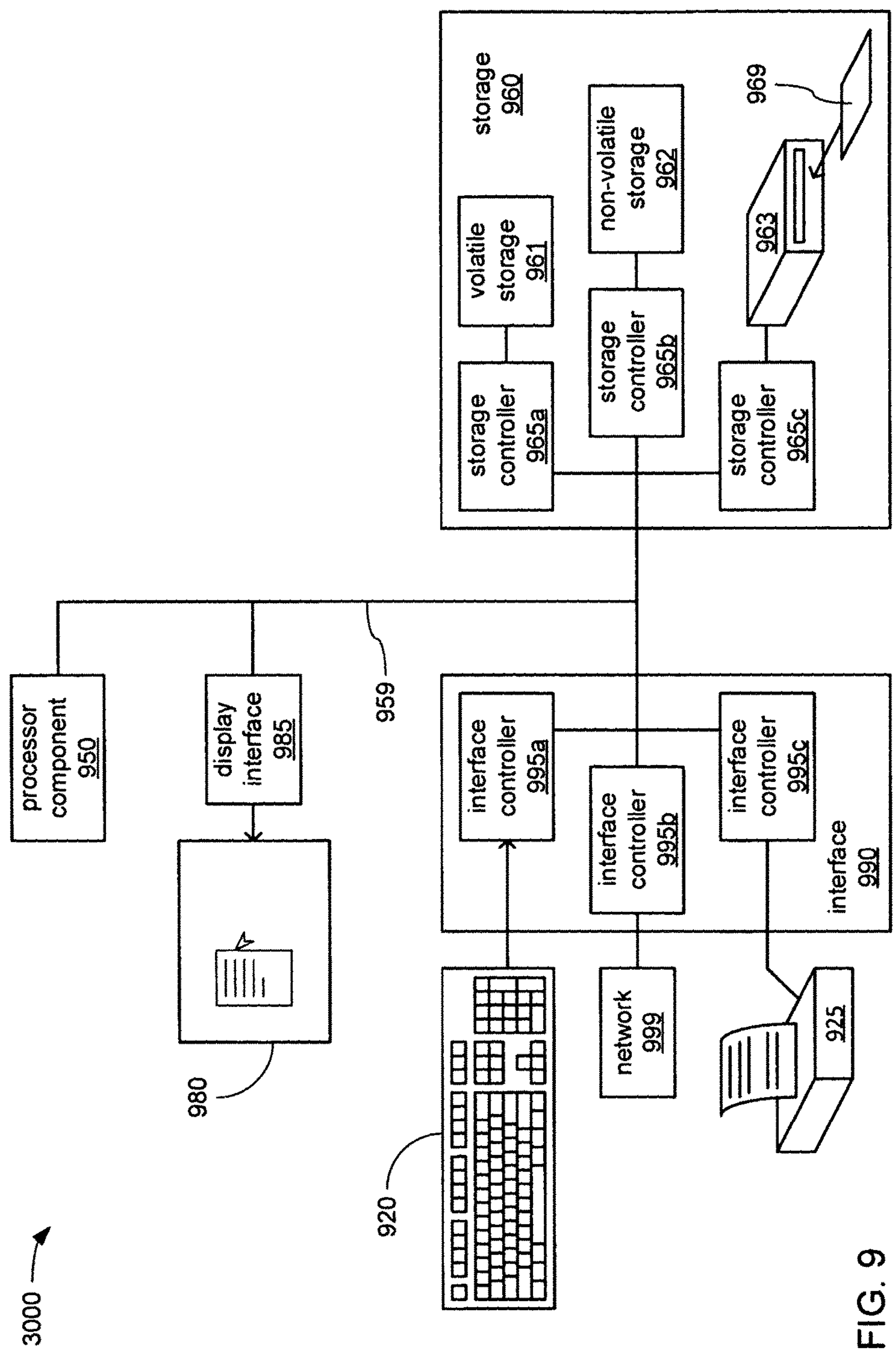
FIG. 9 illustrates a processing architecture according to an embodiment.

FIG. 9 illustrates an embodiment of an exemplary processing architecture 3000 suitable for implementing various embodiments as previously described. More specifically, the processing architecture 3000 (or variants thereof) may be implemented as part of one or more of the devices 100, 200, 304, 305 or 500, and/or the controller 400. It should be noted that components of the processing architecture 3000 are given reference numbers in which the last two digits correspond to the last two digits of reference numbers of at least some of the components earlier depicted and described as part of these devices and/or controllers. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an, entity of a device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire device (e.g., an entire computer). By way of illustration, both an application running on a server and the server can be a component. One or more components can reside within a process and/or thread of execution, and a component can be localized on one device and/or distributed between two or more devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a device includes at least a processor component 950, a storage 960, an interface 990 to other devices, and a coupling 959. As will be explained, depending on various aspects of a device implementing the processing architecture 3000, including its intended use and/or conditions of use, such a device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (which may correspond to the processor component 450) may include any of a wide variety of commercially available processors, employing any of a wide variety of technologies and implemented with one or more cores physically combined in any of a number of ways.

As previously discussed, the storage 960 (which may correspond to the storage 460) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between devices). This depiction of the storage 960 as possibly including multiple distinct types of storage is in recognition of the commonplace use of more than one type of storage device in devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a device through different storage controllers coupled to their differing storage devices through different interfaces. By way of example, where the volatile storage 961 is present and is based on RAM technology, the volatile storage 961 may be communicatively coupled to coupling 959 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965*b* providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interface(s) 490) may employ any of a variety of signaling technologies corresponding to any of a variety of communications technologies that may be employed to communicatively couple a device to one or more other devices. Again, one or both of various forms of wired or wireless signaling may be employed to enable the processor component 950 to interact with input/output devices (e.g., the depicted example keyboard 920 or printer 925) and/or other devices, possibly through a network (e.g., the network 999) or an interconnected set of networks. In recognition of the often greatly different character of multiple types of signaling and/or protocols that must often be supported by any one device, the interface 990 is depicted as including multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other devices through the depicted network 999 (perhaps a network made up of one or more links, smaller networks, or perhaps the Internet). More specifically, the interface controller 995*b* may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface controller 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a device is communicatively coupled to (or perhaps, actually incorporates) a display (e.g., the depicted example display 980), such a device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the devices described and depicted herein may include various hardware elements, software elements, or a combination of both.

Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a processor component comprising a cache, the cache comprising a cache line to store a first block of data that is to correspond to a second block of encrypted data stored within a storage by the processor component; a compressor to compress the data within the first block to generate compressed data within the first block to clear sufficient storage space within the first block to store metadata associated with generation of the second block of encrypted data from the first block of data in response to eviction of the first block of data from the cache line; and an encrypter to encrypt the compressed data within the first block to generate the encrypted data within the second block and to store encryption metadata associated with the encryption of the compressed data within the second block as a portion of the metadata associated with the generation of the second block.

In Example 2, which includes the subject matter of Example 1, the apparatus may include a measurer to take a first measure of the data within the first block prior to the compression of the data within the first block, and to store an integrity metadata indicative of the first measure within the second block as a portion of the metadata associated with the generation of the second block.

In Example 3, which includes the subject matter of any of Examples 1-2, the apparatus may include a decrypter to retrieve the encryption metadata from the second block and to employ the encryption metadata to decrypt the encrypted data to recreate the first block and the compressed data within the first block in response to retrieval of the second block of encrypted data from the storage by the processor component; and a decompressor to decompress the recreated compressed data within the recreated first block to recreate the data within the recreated first block in uncompressed form.

In Example 4, which includes the subject matter of any of Examples 1-3, the apparatus may include a verifier to retrieve the integrity metadata from the second block to obtain the first measure, to take a second measure of the recreated data within the recreated first block, and to compare the second measure to the first measure to verify preservation of integrity of the data during storage as the encrypted data.

In Example 5, which includes the subject matter of any of Examples 1-4, the compressor may determine whether the data within the first block is able to be compressed sufficiently to clear sufficient storage space within the first block to store the metadata associated with the generation of the second block, the compressor may condition compression of the data within the first block on a determination that the data is able to be compressed sufficiently, and the encrypter may condition storage of the metadata associated with generation of the second block within the second block in lieu of a third block on a determination that the data is able to be compressed sufficiently.

In Example 6, which includes the subject matter of any of Examples 1-5, in response to a determination that the data within the first block is not able to be compressed sufficiently, the compressor may refrain from compressing the data within the first block, the encrypter may store the metadata associated with generation of the second block within the third block, and the processor component may store the second and third blocks within the storage.

In Example 7, which includes the subject matter of any of Examples 1-6, the compressor may store in the second block a first compression indicator indicative of the data within the first block as having been compressed in response to a determination that the data within the first block is able to be sufficiently compressed.

In Example 8, which includes the subject matter of any of Examples 1-7, the compressor may store at a location occupied by a portion of the encrypted data in the second block a second compression indicator indicative of the data within the first block as having not been compressed in response to a determination that the data within the first block is not able to be sufficiently compressed and in response to the portion of the encrypted data providing a value that matches the first compression indicator, and the compressor may store the portion of the encrypted data within the third block.

In Example 9, which includes the subject matter of any of Examples 1-8, the apparatus may include a decrypter to retrieve portions of the encrypted data from the second and third blocks and to decrypt the encrypted data to recreate the first block and the data within the first block in response to storage of the second compression indicator in the second block.

In Example 10, which includes the subject matter of any of Examples 1-9, the encrypter may include a counter to provide a unique counter value as an input to encrypting data within each block of data of multiple blocks of data evicted by the cache line, and the encrypter may include in encryption metadata associated with each block of the multiple blocks an indication of the corresponding counter value.

In Example 11, which includes the subject matter of any of Examples 1-10, the first block of data may be evicted from the cache line to store the second block of encrypted data at a location within the storage associated with a physical address, and the encrypter may employ the physical address as an input to the encryption of the compressed data within the first block.

In Example 12, which includes the subject matter of any of Examples 1-11, the apparatus may include a decrypter to employ the physical address to decrypt the encrypted data within the second block to recreate the first block and the compressed data within the first block.

In Example 13, which includes the subject matter of any of Examples 1-12, the first block of data may be evicted from the cache line to store the second block of encrypted data at a location within the storage associated with a physical address, and the encrypter may employ at least one uppermost bit of the physical address to select an encryption value to employ as an input to the encryption of the compressed data within the first block and to include an indication of the at least one uppermost bit in the encryption metadata.

In Example 14, which includes the subject matter of any of Examples 1-13, the encryption metadata may comprise at least one of an indication of type of encryption employed by the encrypter to encrypt the compressed data, an indication of a selection of an encryption value employed by the encrypter to encrypt the compressed data from among multiple encryption values, or an indication of a counter value employed by the encrypter to encrypt the compressed data.

In Example 15, an apparatus includes a processor component comprising a cache, the cache comprising a cache line to store a recreation of a first block of data that is to correspond to a second block of encrypted data stored within a storage by the processor component; a decrypter to, in response to retrieval of the second block of encrypted data from the storage, retrieve from the second block a compression indicator that indicates whether the data within the first block was compressed to generate the encrypted data within the second block, and to decrypt the encrypted data within the second block to recreate the data or to recreate compressed data within the recreation of the first block based on the compression indicator; and a decompressor to decompress the recreated compressed data within the recreation of the first block to recreate the data within the recreation of the first block based on the compression indicator.

In Example 16, which includes the subject matter of Example 15, the apparatus may include a verifier to retrieve integrity metadata from the second block to obtain a first measure taken of the data within the first block prior to encryption of the data within the first block to generate the encrypted data within the second block, to take a second measure of the recreated data within the recreation of the first block, and to compare the second measure to the first measure to verify preservation of integrity of the data during storage as the encrypted data.

In Example 17, which includes the subject matter of any of Examples 15-16, the apparatus may include a compressor to compress the data within the first block to generate the compressed data within the first block to clear sufficient storage space within the first block to store the compression indicator and metadata associated with generation of the second block of encrypted data from the first block of data in response to eviction of the first block of data from the cache line; and an encrypter to encrypt the compressed data within the first block to generate the encrypted data within the second block.

In Example 18, which includes the subject matter of any of Examples 15-17, the apparatus may include a measurer to take the first measure of the data within the first block prior to the compression of the data within the first block, and to store the integrity metadata indicative of the first measure within the second block as a portion of the metadata associated with the generation of the second block.

In Example 19, which includes the subject matter of any of Examples 15-18, the decrypter may retrieve a portion of the encrypted data from a third block and to decrypt portions of the encrypted data from the second and third blocks to recreate the data within the recreation of the first block in response to an indication by the compression indicator that the data within the first block was not compressed to generate the encrypted data within the second block.

In Example 20, which includes the subject matter of any of Examples 15-19, the apparatus may include a compressor to determine whether the data within the first block is able to be compressed sufficiently to clear sufficient storage space within the first block to store the compression indicator and metadata associated with generation of the second block of encrypted data, compress the data within the first block to generate the compressed data in response to a determination that the data within the first block is able to be compressed sufficiently, and to refrain from compressing the data within the first block in response to a determination that the data within the first block is not able to be compressed sufficiently.

In Example 21, a computing-implemented method includes storing, within a cache line of a cache of a processor component, a first block of data that is to correspond to a second block of encrypted data stored within a storage by the processor component; compressing the data within the first block to generate compressed data within the first block to clear sufficient storage space within the first block to store metadata associated with generation of the second block of encrypted data from the first block of data in response to eviction of the first block of data from the cache line; encrypting the compressed data within the first block to generate the encrypted data within the second block; and storing encryption metadata associated with the encryption of the compressed data within the second block as a portion of the metadata associated with the generation of the second block.

In Example 22, which includes the subject matter of Example 21, the method may include taking a first measure of the data within the first block prior to compressing the data within the first block and storing an integrity metadata indicative of the first measure within the second block as a portion of the metadata associated with the generation of the second block.

In Example 23, which includes the subject matter of any of Examples 21-22, the method may include retrieving the second block from the storage, employing the encryption metadata within the second block to decrypt the encrypted data to recreate the first block and the compressed data within the first block, and decompressing the recreated compressed data within the recreated first block to recreate the data within the recreated first block in uncompressed form.

In Example 24, which includes the subject matter of any of Examples 21-23, the method may include taking a second measure of the recreated data within the recreated first block and comparing the second measure to the first measure indicated by the integrity metadata to verify preservation of integrity of the data during storage as the encrypted data.

In Example 25, which includes the subject matter of any of Examples 21-24, the method may include determining whether the data within the first block is able to be compressed sufficiently to clear sufficient storage space within the first block to store the metadata associated with the generation of the second block; and conditioning, on a determination that the data is able to be compressed sufficiently, compressing the data within the first block and storing the metadata associated with generation of the second block within the second block in lieu of a third block.

In Example 26, which includes the subject matter of any of Examples 21-25, the method may include, in response to a determination that the data within the first block is not able to be compressed sufficiently, refraining from compressing the data within the first block, storing the metadata associated with generation of the second block within the third block, and transmitting the second and third blocks to a storage controller coupled to the processor component to store the second and third blocks within the storage.

In Example 27, which includes the subject matter of any of Examples 21-26, the method may include storing in the second block a first compression indicator indicative of the data within the first block as having been compressed in response to a determination that the data within the first block is able to be sufficiently compressed.

In Example 28, which includes the subject matter of any of Examples 21-27, the method may include, in response to a determination that the data within the first block is not able to be sufficiently compressed and in response to the portion of the encrypted data providing a value that matches the first compression indicator, storing at a location occupied by a portion of the encrypted data in the second block a second compression indicator indicative of the data within the first block as having not been compressed and storing the portion of the encrypted data within the third block.

In Example 29, which includes the subject matter of any of Examples 21-28, the method may include, in response to storage of the second compression indicator in the second block, retrieving portions of the encrypted data from the second and third blocks and decrypting the encrypted data to recreate the first block and the data within the first block.

In Example 30, which includes the subject matter of any of Examples 21-29, the method may include operating a counter incorporated into the processor component to provide a unique counter value as an input to encrypting data within each block of data of multiple blocks of data evicted by the cache line; and including in encryption metadata associated with each block of the multiple blocks an indication of the corresponding counter value.

In Example 31, which includes the subject matter of any of Examples 21-30, the first block of data may be evicted from the cache line to store the second block of encrypted data at a location within the storage associated with a physical address, and the method may include employing the physical address as an input to the encryption of the compressed data within the first block.

In Example 32, which includes the subject matter of any of Examples 21-31, the first block of data may be evicted from the cache line to store the second block of encrypted data at a location within the storage associated with a physical address, and the method may include employing at least one uppermost bit of the physical address to select an encryption value to employ as an input to the encryption of the compressed data within the first block and including an indication of the at least one uppermost bit in the encryption metadata.

In Example 33, which includes the subject matter of any of Examples 21-32, the encryption metadata to comprise at least one of an indication of type of encryption employed by the encrypter to encrypt the compressed data, an indication of a selection of an encryption value employed by the encrypter to encrypt the compressed data from among multiple encryption values, or an indication of a counter value employed by the encrypter to encrypt the compressed data.

In Example 34, at least one tangible machine-readable storage medium includes instructions that when executed by a processing device, may cause the processing device to store, within a cache line of a cache of a processor component, a first block of data that is to correspond to a second block of encrypted data stored within a storage by the processor component; compress the data within the first block to generate compressed data within the first block to clear sufficient storage space within the first block to store metadata associated with generation of the second block of encrypted data from the first block of data in response to eviction of the first block of data from the cache line; encrypt the compressed data within the first block to generate the encrypted data within the second block; and store encryption metadata associated with the encryption of the compressed data within the second block as a portion of the metadata associated with the generation of the second block.

In Example 35, which includes the subject matter of Example 34, the processing device may be caused to take a first measure of the data within the first block prior to compressing the data within the first block; and store an integrity metadata indicative of the first measure within the second block as a portion of the metadata associated with the generation of the second block.

In Example 36, which includes the subject matter of any of Examples 34-35, the processing device may be caused to retrieve the second block from the storage; employ the encryption metadata within the second block to decrypt the encrypted data to recreate the first block and the compressed data within the first block; and decompress the recreated compressed data within the recreated first block to recreate the data within the recreated first block in uncompressed form.

In Example 37, which includes the subject matter of any of Examples 34-36, the processing device may be caused to take a second measure of the recreated data within the recreated first block, and compare the second measure to the first measure indicated by the integrity metadata to verify preservation of integrity of the data during storage as the encrypted data.

In Example 38, which includes the subject matter of any of Examples 34-37, the processing device may be caused to determine whether the data within the first block is able to be compressed sufficiently to clear sufficient storage space within the first block to store the metadata associated with the generation of the second block; and condition, on a determination that the data is able to be compressed sufficiently, compressing the data within the first block and storing the metadata associated with generation of the second block within the second block in lieu of a third block.

In Example 39, which includes the subject matter of any of Examples 34-38, the processing device may be caused to refrain from compressing the data within the first block; store the metadata associated with generation of the second block within the third block; and transmit the second and third blocks to a storage controller coupled to the processor component to store the second and third blocks within the storage.

In Example 40, which includes the subject matter of any of Examples 34-39, the processing device may be caused to store in the second block a first compression indicator indicative of the data within the first block as having been compressed in response to a determination that the data within the first block is able to be sufficiently compressed.

In Example 41, which includes the subject matter of any of Examples 34-40, the processing device may be caused, in response to a determination that the data within the first block is not able to be sufficiently compressed and in response to the portion of the encrypted data providing a value that matches the first compression indicator, to store at a location occupied by a portion of the encrypted data in the second block a second compression indicator indicative of the data within the first block as having not been compressed and store the portion of the encrypted data within the third block.

In Example 42, which includes the subject matter of any of Examples 34-41, the processing device may be caused, in response to storage of the second compression indicator in the second block, to retrieve portions of the encrypted data from the second and third blocks and decrypt the encrypted data to recreate the first block and the data within the first block.

In Example 43, which includes the subject matter of any of Examples 34-42, the processing device may be caused to operate a counter incorporated into the processor component to provide a unique counter value as an input to encrypting data within each block of data of multiple blocks of data evicted by the cache line, and include in encryption metadata associated with each block of the multiple blocks an indication of the corresponding counter value.

In Example 44, which includes the subject matter of any of Examples 34-43, the first block of data may be evicted from the cache line to store the second block of encrypted data at a location within the storage associated with a physical address, and the processing device may be caused to employ the physical address as an input to the encryption of the compressed data within the first block.

In Example 45, which includes the subject matter of any of Examples 34-44, the first block of data may be evicted from the cache line to store the second block of encrypted data at a location within the storage associated with a physical address, the processing device may be caused to employ at least one uppermost bit of the physical address to select an encryption value to employ as an input to the encryption of the compressed data within the first block, and include an indication of the at least one uppermost bit in the encryption metadata.

In Example 46, which includes the subject matter of any of Examples 34-45, the encryption metadata may include at least one of an indication of type of encryption employed by the encrypter to encrypt the compressed data, an indication of a selection of an encryption value employed by the encrypter to encrypt the compressed data from among multiple encryption values, or an indication of a counter value employed by the encrypter to encrypt the compressed data.

In Example 47, at least one tangible machine-readable storage medium may include instructions that when executed by a processor component, cause the processor component to perform any of the above.

In Example 48, an apparatus may include means for performing any of the above.

The invention claimed is:

1. An apparatus to support secure processing comprising:

a processor component comprising a cache, the cache comprising a cache line to store a first block of data that is to correspond to a second block of encrypted data stored within a storage by the processor component;

a compressor to compress the data within the first block to generate compressed data within the first block to clear sufficient storage space within the first block to store a first metadata associated with generation of the second block of encrypted data from the first block of data in response to eviction of the first block of data from the cache line; and an encrypter to:

encrypt the compressed data and the first metadata within the first block to generate the encrypted data within the second block within the storage;

generate a cryptographic hash of the encrypted data and store, within the second block within the storage: (i) encryption metadata associated with the encryption of the compressed data and the encryption of the first metadata, and (ii) integrity metadata indicative of the cryptographic hash of the encrypted data.

2. The apparatus of claim 1, comprising a measurer to take a first measure of the data within the first block prior to the compression of the data within the first block, and to store integrity metadata indicative of the first measure within the second block.

3. The apparatus of claim 1, the compressor to determine whether the data within the first block is able to be compressed sufficiently to clear sufficient storage space within the first block to store at least the first metadata, the compressor to condition compression of the data within the first block on a determination that the data is able to be compressed sufficiently, and the encrypter to condition storage of at least the first metadata within the second block in lieu of a third block on a determination that the data is able to be compressed sufficiently.

4. The apparatus of claim 3, in response to a determination that the data within the first block is not able to be compressed sufficiently, the compressor to refrain from compressing the data within the first block, the encrypter to store the encryption metadata and the integrity metadata within the third block, and the processor component to store the second and third blocks within the storage.

5. The apparatus of claim 1, the encrypter comprising a counter to provide a unique counter value as an input to encrypting data within each block of data of multiple blocks of data evicted by the cache line, the encrypter to store the encryption metadata in a metadata store accessible by a security subsystem of the processor component, and the encrypter to include in encryption metadata associated with each block of the multiple blocks an indication of the corresponding counter value.

6. The apparatus of claim 1, a size of the first block and a size of the second block to correspond to a size of the cache line, the first block of data evicted from the cache line to store the second block of encrypted data at a location within the storage associated with a physical address, and the encrypter to employ the physical address as an input to the encryption of the compressed data within the first block.

7. The apparatus of claim 6, comprising a decrypter to employ the physical address to decrypt the encrypted data within the second block to recreate the first block and the compressed data within the first block, the encrypter to encrypt the integrity metadata, the storage comprising at least one of a volatile memory and a non-volatile memory of the apparatus.

8. An apparatus to support secure processing comprising:

a processor component comprising a cache, the cache comprising a cache line to store a recreation of a first block of data that is to correspond to a second block of encrypted data stored within a storage of the apparatus by the processor component, the encrypted data comprising a compression indicator indicating whether the data within the first block was compressed to generate the encrypted data within the second block, the encrypted data comprising metadata associated with generation of the second block from the first block;

a verifier to, in response to retrieval of the second block of encrypted data from the storage, retrieve integrity metadata from the second block to verify preservation of integrity of the encrypted data, the integrity metadata including a cryptographic hash of the encrypted data;

a decrypter to, in response to retrieval of the second block of encrypted data from the storage, decrypt the encrypted data within the second block to recreate the data or to recreate compressed data within the recreation of the first block based on the compression indicator; and a decompressor to decompress the recreated compressed data within the recreation of the first block to recreate the data within the recreation of the first block based on the compression indicator.

9. The apparatus of claim 8, the verifier to retrieve integrity metadata from the second block to obtain a first measure taken of the data within the first block prior to encryption of the data within the first block to generate the encrypted data within the second block, to take a second measure of the recreated data within the recreation of the first block, and to compare the second measure to the first measure to verify preservation of integrity of the data during storage as the encrypted data, a size of the first block and a size of the second block to correspond to a size of the cache line.

10. The apparatus of claim 9, comprising:

a compressor to compress the data within the first block to generate the compressed data within the first block to clear sufficient storage space within the first block to store the compression indicator and a first metadata associated with generation of the second block of encrypted data from the first block of data in response to eviction of the first block of data from the cache line; and an encrypter to encrypt the compressed data and the first metadata within the first block to generate the encrypted data within the second block.

11. The apparatus of claim 10, comprising a measurer to take the first measure of the data within the first block prior to the compression of the data within the first block, and to store the integrity metadata indicative of the first measure within the second block.

12. The apparatus of claim 8, the decrypter to retrieve a portion of the encrypted data from a third block and to decrypt portions of the encrypted data from the second and third blocks to recreate the data within the recreation of the first block in response to an indication by the compression indicator that the data within the first block was not compressed to generate the encrypted data within the second block.

13. The apparatus of claim 12, comprising a compressor to determine whether the data within the first block is able to be compressed sufficiently to clear sufficient storage space within the first block to store at least the compression indicator and the first, compress the data within the first block to generate the compressed data in response to a determination that the data within the first block is able to be compressed sufficiently, and to refrain from compressing the data within the first block in response to a determination that the data within the first block is not able to be compressed sufficiently, the storage comprising at least one of a volatile memory and a non-volatile memory of the apparatus.

14. A computer-implemented method for supporting secure processing comprising:

storing, within a cache line of a cache of a processor component, a first block of data that is to correspond to a second block of encrypted data stored within a storage by the processor component;

compressing the data within the first block to generate compressed data within the first block to clear sufficient storage space within the first block to store a first metadata associated with generation of the second block of encrypted data from the first block of data in response to eviction of the first block of data from the cache line;

encrypting the compressed data and the first metadata within the first block to generate the encrypted data within the second block within the storage;

generating a cryptographic hash of the encrypted data; and storing, within the second block within the storage: (i) encryption metadata associated with the encryption of the compressed data and the encryption of the first metadata, and (ii) integrity metadata indicative of the cryptographic hash of the encrypted data.

15. The computer-implemented method of claim 14, comprising:

taking a first measure of the data within the first block prior to compressing the data within the first block; and storing integrity metadata indicative of the first measure within the second block as a portion of the metadata associated with the generation of the second block.

16. The computer-implemented method of claim 15, comprising:

retrieving the second block from the storage;

employing the encryption metadata within the second block to decrypt the encrypted data to recreate the first block and the compressed data within the first block; and decompressing the recreated compressed data within the recreated first block to recreate the data within the recreated first block in uncompressed form.

17. The computer-implemented method of claim 16, comprising:

taking a second measure of the recreated data within the recreated first block; and comparing the second measure to the first measure indicated by the integrity metadata to verify preservation of integrity of the data during storage as the encrypted data.

18. The computer-implemented method of claim 14, comprising:

determining whether the data within the first block is able to be compressed sufficiently to clear sufficient storage space within the first block to store the first metadata; and conditioning, on a determination that the data is able to be compressed sufficiently, compressing the data within the first block and storing the first metadata within the second block in lieu of a third block.

19. The computer-implemented method of claim 14, a size of the first block and a size of the second block to correspond to a size of the cache line, the encrypter to encrypt the integrity metadata, the storage comprising at least one of a volatile memory and a non-volatile memory, the first block of data evicted from the cache line to store the second block of encrypted data at a location within the storage associated with a physical address, the method comprising:

employing at least one uppermost bit of the physical address to select an encryption value to employ as an input to the encryption of the compressed data within the first block; and including an indication of the at least one uppermost bit in the encryption metadata.

20. At least one non-transitory machine-readable storage medium comprising instructions that when executed by a processing device, cause the processing device to:

store, within a cache line of a cache of a processor component, a first block of data that is to correspond to a second block of encrypted data stored within a storage by the processor component;

compress the data within the first block to generate compressed data within the first block to clear sufficient storage space within the first block to store a first metadata associated with generation of the second block of encrypted data from the first block of data in response to eviction of the first block of data from the cache line;

encrypt the compressed data and the first metadata within the first block to generate the encrypted data within the second block within the storage;

generate a cryptographic hash of the encrypted data; and store, within the second block within the storage: (i) encryption metadata associated with the encryption of the compressed data and the encryption of the first metadata, and (ii) integrity metadata indicative of the cryptographic hash of the encrypted data.

21. The at least one non-transitory machine-readable storage medium of claim 20, a size of the first block and a size of the second block to correspond to a size of the cache line, integrity metadata encrypted, the storage comprising at least one of a volatile memory and a non-volatile memory, the processing device caused to:

determine whether the data within the first block is able to be compressed sufficiently to clear sufficient storage space within the first block to store the first metadata; and condition, on a determination that the data is able to be compressed sufficiently, compressing the data within the first block and storing the first metadata within the second block in lieu of a third block.

22. The at least one non-transitory machine-readable storage medium of claim 21, the processing device caused to:

refrain from compressing the data within the first block;

store the first metadata within the third block; and transmit the second and third blocks to a storage controller coupled to the processor component to store the second and third blocks within the storage.

23. The at least one non-transitory machine-readable storage medium of claim 22, the processing device caused to store in the second block a first compression indicator indicative of the data within the first block as having been compressed in response to a determination that the data within the first block is able to be sufficiently compressed.

24. The at least one non-transitory machine-readable storage medium of claim 23, the processing device caused, in response to a determination that the data within the first block is not able to be sufficiently compressed and in response to the portion of the encrypted data providing a value that matches the first compression indicator, to:

store at a location occupied by a portion of the encrypted data in the second block a second compression indicator indicative of the data within the first block as having not been compressed; and store the portion of the encrypted data within the third block.

25. The at least one non-transitory machine-readable storage medium of claim 24, the processing device caused, in response to storage of the second compression indicator in the second block, to:

retrieve portions of the encrypted data from the second and third blocks; and decrypt the encrypted data to recreate the first block and the data within the first block.

* * * * *